United States Patent
Park et al.

(10) Patent No.: US 11,531,630 B2
(45) Date of Patent: Dec. 20, 2022

(54) MEMORY CONTROLLER, MEMORY SYSTEM AND OPERATING METHOD OF THE MEMORY SYSTEM FOR SCHEDULING DATA ACCESS ACROSS CHANNELS OF MEMORY CHIPS WITHIN THE MEMORY SYSTEM

(71) Applicant: SAMSUNG ELECTRONICS CO., LTD., Suwon-si (KR)

(72) Inventors: Ikkyun Park, Suwon-si (KR); Soongmann Shin, Hwaseong-si (KR); Gyuseok Choe, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/078,194

(22) Filed: Oct. 23, 2020

(65) Prior Publication Data

US 2021/0149828 A1 May 20, 2021

(30) Foreign Application Priority Data

Nov. 18, 2019 (KR) ........................ 10-2019-0148089

(51) Int. Cl.
*G06F 13/16* (2006.01)
*G06F 11/30* (2006.01)
*G06F 11/07* (2006.01)
*G06F 9/48* (2006.01)

(52) U.S. Cl.
CPC ........ *G06F 13/1668* (2013.01); *G06F 9/4881* (2013.01); *G06F 11/076* (2013.01); *G06F 11/3037* (2013.01); *G06F 11/3058* (2013.01); *G06F 13/1605* (2013.01)

(58) Field of Classification Search
CPC ............. G06F 13/1668; G06F 13/1605; G06F 11/3058
See application file for complete search history.

(56) References Cited

U.S. PATENT DOCUMENTS

| | | |
|---|---|---|
| 5,699,532 A | 12/1997 | Barrett et al. |
| 6,732,323 B1 | 5/2004 | Mitlin et al. |
| 8,190,425 B2 | 5/2012 | Mehrotra et al. |
| 8,533,403 B1 | 9/2013 | Law |
| 9,141,568 B2 | 9/2015 | Biswas et al. |
| 9,223,373 B2 | 12/2015 | Thakkar et al. |
| 9,570,058 B2 | 2/2017 | Umeo |
| 9,711,232 B2 | 7/2017 | Choi et al. |

(Continued)

*Primary Examiner* — David E Martinez
(74) *Attorney, Agent, or Firm* — F. Chau & Associates, LLC

(57) ABSTRACT

An operating method of a memory system including a memory device including a plurality of memory chips is provided. The operating method includes setting a parameter indicating a number of the memory chips allowed to operate in parallel for each of a plurality of operation statuses, based on information about power consumption of each of the plurality of operation statuses of a memory chip among the memory chips; obtaining information about an operation status of each of the plurality of memory chips; and scheduling data access across a plurality of channels respectively corresponding to the plurality of memory chips, based on the parameter and the information about the operation status of each of the plurality of memory chips.

18 Claims, 25 Drawing Sheets

(56) References Cited

U.S. PATENT DOCUMENTS

| | | | |
|---|---|---|---|
| 2002/0181311 A1* | 12/2002 | Miyauchi | G11C 5/143 |
| | | | 365/227 |
| 2004/0034749 A1* | 2/2004 | Jeddeloh | G11C 11/4074 |
| | | | 711/154 |
| 2010/0191900 A1* | 7/2010 | Park | G06F 12/0246 |
| | | | 711/E12.008 |
| 2012/0290756 A1 | 11/2012 | Damodaran et al. | |
| 2016/0269195 A1 | 9/2016 | Coenen et al. | |
| 2017/0229131 A1 | 8/2017 | Purnhagen et al. | |
| 2018/0335977 A1 | 11/2018 | Tidwell et al. | |
| 2019/0286338 A1* | 9/2019 | Noda | G06F 3/0679 |

* cited by examiner

FIG. 2A

Table A

| Temp: A | PG | tPROG | ER | RD |
|---|---|---|---|---|
| Parameter 1 (PG) | X1 | | | |
| Parameter 2 (tPROG) | X2 | W1 | | |
| Parameter 3 (ER) | | | Y1 | |
| Parameter 4 (RD) | | | | Z1 |
| Parameter 5 (PG, ER) | X3 | | Y2 | |
| Parameter 6 (ER, RD) | | | Y3 | Z2 |
| Parameter 7 (PG, RD) | X4 | | | Z3 |
| Parameter 8 (PG, ER, RD) | X5 | | Y4 | Z4 |

FIG. 2B

| Temp: B | PG | tPROG | ER | RD |
|---|---|---|---|---|
| Parameter 1 (PG) | X6 | | | |
| Parameter 2 (tPROG) | X7 | W2 | | |
| Parameter 3 (ER) | | | Y5 | |
| Parameter 4 (RD) | | | | Z5 |
| Parameter 5 (PG, ER) | X8 | | Y6 | |
| Parameter 6 (ER, RD) | | | Y7 | Z6 |
| Parameter 7 (PG, RD) | X9 | | | Z7 |
| Parameter 8 (PG, ER, RD) | X10 | | Y8 | Z8 |

Table B

FIG. 3

| Operation Status Info | | | | | | | |
|---|---|---|---|---|---|---|---|
| Chip 1 | Chip 2 | Chip 3 | Chip 4 | Chip 5 | Chip 6 | Chip 7 | Chip 8 |
| PG | ID | ID | RD | ID | ID | ID | PG |

MEMORY CONTROLLER, MEMORY SYSTEM AND OPERATING METHOD OF THE MEMORY SYSTEM FOR SCHEDULING DATA ACCESS ACROSS CHANNELS OF MEMORY CHIPS WITHIN THE MEMORY SYSTEM

CROSS-REFERENCE TO RELATED APPLICATION

This U.S. non-provisional patent application claims the benefit of priority under 35 U.S.C. § 119 to Korean Patent Application No. 10-2019-0148089, filed on Nov. 18, 2019, in the Korean Intellectual Property Office, the disclosure of which is incorporated by reference in its entirety herein.

BACKGROUND

1. Technical Field

The inventive concept relates to memory controllers, memory systems, and operating methods of the memory systems.

2. Discussion of Related Art

A memory system may include a plurality of memory chips, a memory controller, and a plurality of channels that connect the memory chips to the memory controller. Power can be managed in the memory system by applying a method that prevents operations of some of the channels or by lowering an operating frequency. However, this method can seriously degrade performance from the viewpoint of Quality of Service (QoS) and cannot dynamically adapt, and thus causes a case where overall power consumption exceeds an allowed power amount.

SUMMARY

At least one embodiment of the inventive concept provides a memory controller that schedules data transmission or reception of a plurality of channels, based on information about the operation statuses of a plurality of chips, thereby preventing an overall power consumption from exceeding an allowed power level and maximizing memory utilization, a memory system, and an operating method of the memory system.

According to an exemplary embodiment of the inventive concept, there is provided an operating method of a memory system including a memory device including a plurality of memory chips is provided. The operating method includes setting a parameter indicating a number of the memory chips allowed to operate in parallel for each of a plurality of operation statuses, based on information about power consumption of each of the plurality of operation statuses of a memory chip among the memory chips; obtaining information about operation status of each of the plurality of memory chips; and scheduling data access across a plurality of channels corresponding to the plurality of memory chips, based on the parameter and the information about the operation status of each of the plurality of memory chips.

According to an exemplary embodiment of the inventive concept, there is provided a memory system including a memory device including a plurality of memory chips; a memory controller configured to control an operation of the memory device; and a plurality of channels configured to connect each of the plurality of memory chips to the memory controller. The memory controller is configured to check an operation status of each of the plurality of memory chips, and, based on information about power consumption of each of a plurality of operation statuses of a memory chip among the memory chips, schedule data access across the plurality of channels by using a parameter indicating a number of the memory chips allowed to operate in parallel for each of the plurality of operation statuses and the checked operation status of each of the plurality of memory chips.

According to an exemplary embodiment of the inventive concept, there is provided a memory controller for controlling an operation of a memory device including a plurality of memory chips, the memory controller including a memory interface (I/F) configured to transmit or receive data via a plurality of channels that connect each of the plurality of memory chips to the memory controller; and a channel arbitration module configured to, when having received an approval request of data transmission or reception via a first channel from the memory IF, obtain information about an operation status of each of the plurality of memory chips, and, based on power consumption of each of a plurality of operation statuses of a memory chip, determine whether to approve the first channel, based on a parameter indicating a number of the memory chips allowed to operate in parallel for each of the plurality of operation statuses and the information about the operation status of each of the plurality of memory chips, and provide a result of the determination to the memory I/F.

BRIEF DESCRIPTION OF THE DRAWINGS

Exemplary embodiments of the inventive concept will be more clearly understood from the following detailed description taken in conjunction with the accompanying drawings in which:

FIGS. 2A and 2B are parameter tables according to an exemplary embodiment of the inventive concept;

FIG. 3 is a table showing information about the respective operation statuses of a plurality of memory chips according to an exemplary embodiment of the inventive concept;

DETAILED DESCRIPTION OF THE EXEMPLARY EMBODIMENTS

Figure 1:
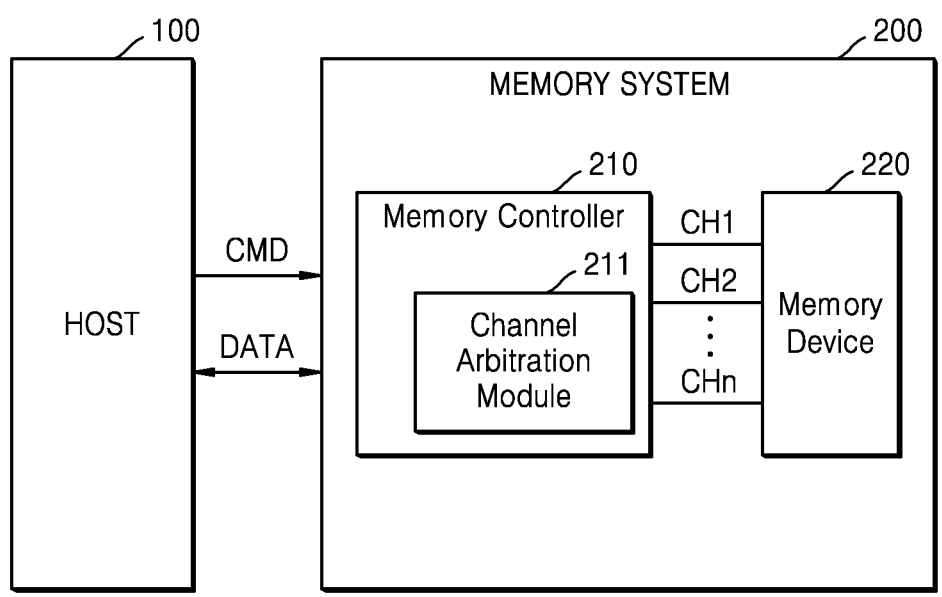
FIG. 1 is a block diagram of a computing system according to an exemplary embodiment of the inventive concept.

FIG. 1 is a block diagram of a computing system 10 according to an exemplary embodiment of the inventive concept.

Referring to FIG. 1, the computing system 10 include a host 100 (e.g., a host device) and a memory system 200. The memory system 200 includes a memory controller 210 (e.g., a control circuit) and a memory device 220.

The host 100 provides a command CMD for a memory operation, or data DATA associated with the command CMD to the memory system 200. For example, the host 100 may provide a write or read request of data to the memory system 200. According to a data erase request from the host 100, the memory system 200 may perform an erase operation with respect to data of an area indicated by the host 100. According to an embodiment, the host 100 may correspond to a central processing unit (CPU), a processor, a microprocessor, or an application processor (AP). According to an exemplary embodiment, the host 100 may be implemented as a system on chip (SoC). Although transmission or reception of the command CMD or the data DATA between the host 100 and the memory system 200 is performed via distinct channels in FIG. 1, embodiments of the inventive concept is not limited thereto. According to an exemplary embodiment, the transmission or reception of the command CMD or the data DATA may be performed via a single channel.

The memory system 200 may include storage media for storing data according to a request from the host 100. For example, the memory system 200 may include one or more solid state drives (SSDs). However, the inventive concept is not limited thereto, and the memory system 200 may be implemented as any of various types of devices such as an embedded multimedia card (eMMC), a universal flash storage (UFS), or a Compact Flash (CF) card, a Secure Digital (SD) card, a Micro Secure Digital (Micro-SD) card, a Mini Secure Digital (Mini-SD) card, an extreme Digital (xD) card, or a memory stick.

When the memory system 200 includes an SSD, the memory device 220 may include a plurality of flash memory chips (for example, NAND memory chips) that stores data in a non-volatile manner. Alternatively, the memory device 220 may correspond to one flash memory device, or the memory device 220 may include a memory card including one or more flash memory chips.

When the memory system 200 includes a flash memory, the flash memory may include a two-dimensional (2D) NAND memory array or a three-dimensional (3D) (or vertical) NAND (VNAND) memory array. The 3D memory array is monolithically formed at one or more physical levels in an array of memory cells having an active area disposed on or above a silicon substrate, or in a circuit formed on or above the silicon substrate or within the silicon substrate, as a circuit related to the operation of the memory cells. The term "monolithic" means that the layers of each level constituting the array are stacked directly above the layers of each lower level of the array.

According to an embodiment of the inventive concept, the 3D memory array includes vertical NAND strings arranged in a vertical direction such that at least one memory cell is positioned on or above another memory cell. The at least one memory cell may include a charge trap layer.

The following patent documents, which are hereby incorporated by reference in their entirety, describe suitable configurations for 3D memory arrays, in which the 3D memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

As another example, the memory system 200 may include various other types of memories. For example, the memory system 200 may include a non-volatile memory. Examples of the non-volatile memory may include various types of memories such as magnetic random access memory (MRAM), spin-transfer torque MRAM, conductive bridging RAM (CBRAM), ferroelectric RAM (FeRAM), phase RAM (PRAM), resistive RAM, nanotube RAM, polymer RAM (PoRAM), nano floating gate memory (NFGM), a holographic memory, a molecular electronics memory, and an insulator resistance change memory.

The memory controller 210 may control memory operations, such as data writing and data reading, with respect to the memory device 220. The memory controller 210 may control memory operations with respect to the memory device 220 via one or more channels. For example, the memory controller 210 may be connected to the memory device 220 via n (where n is a natural number) channels CH1 through CHn and may write or read data. The memory controller 210 may control the memory device 220 connected to different channels, in parallel.

According to an exemplary embodiment, the memory device 220 includes a plurality of memory chips. The memory device 220 may include one or more memory chips to correspond to each of the n channels CH1 through CHn. The memory controller 210 may queue commands CMD for each of the n channels CH1 through CHn according to the command CMD (or a request) received from the host 100, and may transmit or receive the command CMD or the data DATA related with the command CMD to or from the memory device 220 via the n channels CH1 through CHn. For example, the memory controller 210 may include a buffer in which commands CMD are stored until they are executed.

According to an exemplary embodiment of the inventive concept, the memory controller 210 includes a channel arbitration module 211 that arbitrates (or manages) the n channels CH1 through CHn. The channel arbitration module 211 may be implemented in various manners and may be included in the memory controller 210. For example, the channel arbitration module 211 may be implemented as hardware such as a circuit that arbitrates a plurality of channels. Alternatively, the channel arbitration module 211 may be implemented as software including a program, and a processing unit may perform various types of processing related with arbitration of a plurality of channels by executing the channel arbitration module 211 loaded in an operation memory. Alternatively, the channel arbitration module 211 may be implemented as a combination of hardware and software. Although the channel arbitration module 211 is included in the memory controller 210 in FIG. 1, embodiments of the inventive concept are not limited thereto. For example, the channel arbitration module 211 may be arranged outside the memory controller 210, but within the memory system 200.

In an exemplary embodiment, the channel arbitration module 211 supports a function of arbitrating a plurality of channels that connect the memory controller 210 to the memory device 220. For example, the channel arbitration module 211 may check operation statuses of the plurality of memory chips of the memory device 220, and arbitrate the n channels CH1 through CHn, based on the checked operation statuses and information about power consumption for each operation.

In an exemplary embodiment, the channel arbitration module 211 calculates a current overall power consumption (e.g., power consumption by the memory system 200 or the memory device 220), based on the checked operation statuses of the plurality of memory chips and the information about the power consumption for each operation, and predicts whether, when the memory device 220 additionally performs a memory operation corresponding to the queued commands CMD, the overall power consumption will exceed an allowed power amount. When it is predicted that the overall power consumption will exceed the allowed power amount, the channel arbitration module 211 defers transmission of the queued command CMD, and may restrict data transmission or reception through a channel corresponding to the corresponding the queued command CMD. On the other hand, when it is predicted that the overall power consumption will not exceed the allowed power amount, the channel arbitration module 211 transmits the queued command CMD, and may allow data transmission or reception through the channel corresponding to the queued command CMD.

Accordingly, while the memory device 220 performs memory operations (or processing of commands) corresponding to a plurality of commands CMD, as the memory controller 210 transmits the plurality of commands CMD to the memory device 220, power consumption may be prevented from exceeding the allowed power amount.

An operation of a memory chip may include at least one of a program operation, a read operation, an erase operation, and an idle state. The program operation may be divided into detailed operations. For example, the program operation may be divided into a data input/output (I/O) operation (for convenience of explanation, referred to as a first program operation) and a data write operation (for convenience of explanation, referred to as a second program operation). The I/O operation corresponds to an operation in which a program command CMD and data DATA are input to a memory chip through a channel and are buffered in an I/O buffer (not shown) included in the memory chip. The data write operation corresponds to an operation in which the data DATA buffered in the I/O buffer included in the memory chip is programmed or written to a memory cell array. Each of the first program operation and the second program operation constitutes a portion of the entire program operation, but, because a power consumption difference between the two operations is large, the two operations may be distinguished from each other. For example, I/O operation may consume a first amount of a power and the data write operation may consume a second amount of power that differs from the first amount.

The above-described types of operation of a memory chip is merely an example, and embodiments of the inventive concept are not limited thereto. For example, a read operation may be divided into an operation in which the data DATA is read from the memory cell array and an operation in which the read data DATA is input to the memory controller 210 via a channel.

According to a an exemplary embodiment of the inventive concept, the channel arbitration module 211 sets a parameter, based on the information about the power consumption for each operation, and arbitrates the n channels CH1 through CHn by using the set parameter and the operation statuses of the plurality of memory chips. The parameter may be the number of memory chips capable of performing each memory operation in parallel as long as the overall power consumption does not exceed a preset power amount, namely, the allowed power amount. For example, the parameter may be the maximum number of memory chips capable of performing a first program operation in parallel as long as the overall power consumption does not exceed the allowed power amount. Because the operations of a memory chip may include a second program operation, a read operation, and an erase operation in addition to the first program operation, different parameters (e.g., sub-parameters) may be set for these different operations, respectively. The above-described plurality of parameters may be included in a single parameter table. The parameter table may be stored in the memory controller 210 or the memory device 220. A method of setting a parameter is not limited to the above-described exemplary method.

As an example of arbitration using a parameter, the channel arbitration module 211 may allow data transmission or reception through a number of the channels, which corresponds to the parameter. For example, the channel arbitration module 211 may allow data transmission or reception through the number of channels which corresponds to the parameter, including channels corresponding to memory chips that are currently performing an operation. For example, the channel arbitration module 211 may only allow data transmission or reception through channels connected to memory chips that are currently performing an operation. In other words, when the number of memory chips currently performing an operation is less than the parameter, the channel arbitration module 211 may allow data transmission or reception through a channel corresponding to the queued command CMD. On the other hand, when the number of memory chips currently performing an operation is equal to the parameter, the channel arbitration module 211 does not allow data transmission or reception of the channels corresponding to the queued command CMD.

Accordingly, the channel arbitration module 211 may manage power consumption of the memory system 200 via a comparison with a preset parameter without calculating the power consumption, so that the number of computations performed may be reduced.

The computing system 10 according to the above-described embodiment may maximize memory utilization by scheduling data transmission or reception through the plurality of channels, based on information about the operation statuses of the plurality of chips within the memory device 220 and the information about power consumption for each operation (or a parameter set based on the information about power consumption for each operation)). Accordingly, the computing system 10 according to the above-described embodiment may secure a higher system performance and secure a high QoS by preventing overall power consumption from exceeding an allowed power level, compared with conventional inefficient power management methods.

FIGS. 2A and 2B are parameter tables according to an exemplary embodiment of the inventive concept.

Referring to FIG. 2A, a parameter table Table A may include different parameters for each operation of a memory chip or each combination of operations of the memory chip. Each operation of a memory chip may include at least one of a first program operation PG, a second program operation tPROG, a read operation RD, and an erase operation ER described above with reference to FIG. 1, and a combination of operations of the memory chip may include at least one of a combination of the first program operation PG and the erase operation ER (e.g., see Parameter 5), a combination of the erase operation ER and the read operation RD (e.g., see Parameter 6), a combination of the first program operation PG and the read operation RD (e.g., see Parameter 7), or a combination of the first program operation PG (e.g., see Parameter 8), the erase operation ER, and the read operation RD. Each operation of a memory chip or each combination of operations of the memory chip are not limited thereto.

A column of the parameter table Table A indicates parameters (first through eighth parameters) corresponding to each operation of the memory chip or each combination of operations of the memory chip. For example, in the parameter table Table A, the first parameter (e.g., Parameter 1) may indicate a parameter corresponding to the first program operation PG, the seventh parameter (e.g., Parameter 7) may indicate a parameter corresponding to a combination of the first program operation PG and the read operation RD, and the eighth parameter (e.g., Parameter 8) may indicate a parameter corresponding to a combination of the first program operation PG, the erase operation ER, and the read operation RD.

A row of the parameter table Table A may represent the number of memory chips capable of performing an operation corresponding to a corresponding parameter. For example, in the parameter table Table A, X1 of the first parameter corresponding to the first program operation PG may mean the maximum number of memory chips capable of performing the first program operation PG. X3 and Y2 of the fifth parameter corresponding to a combination of the first program operation PG and the erase operation ER may mean the maximum number of memory chips capable of performing the first program operation PG and the maximum number of memory chips capable of performing the erase operation ER, respectively.

The channel arbitration module 211 of FIG. 1 may check a parameter corresponding to an operation of current memory chips from the parameter table Table A, and may approve data transmission or reception through channels, the number of which corresponds to the parameter. For example, when current memory chips perform the first program operation PG, the channel arbitration module 211 may check X1 (e.g., 3) as a parameter corresponding to the first program operation PG, and may approve data transmission or reception through channels (e.g., 3 channels), the number of which corresponds to X1.

A plurality of parameter tables as described above may be set. According to an exemplary embodiment, different parameter tables are set according to different temperature ranges. Power consumption due to an operation of a memory chip may vary according to a temperature of a memory system. Accordingly, to perform power management that is suitable for the temperature of a memory system, the channel arbitration module 211 may set different parameter tables according to different temperature ranges, and may schedule data transmission or reception of the plurality of channels by using a parameter table corresponding to the temperature of the memory system.

Referring to FIG. 2B, a parameter table Table B may correspond to a temperature range B that is different from a temperature range A of the parameter table Table A. In the parameter table Table B, like the parameter table Table A, a column may indicate parameters (first through eighth parameters) corresponding to each operation of the memory chip or each combination of operations of the memory chip, and a row may represent the number of memory chips capable of performing an operation corresponding to a corresponding parameter. The temperature range B may be higher or lower than the temperature range A. In an exemplary embodiment, when the temperature range B is higher than the temperature range A, the parameters included in the parameter table Table B have smaller values than the values of parameters included in the parameter table Table A.

The channel arbitration module 211 of FIG. 1 may check the parameter table Table B corresponding to the temperature of a current memory system from among a plurality of parameter tables (e.g., Table A and Table B), may check a parameter corresponding to an operation of current memory chips from the parameter table Table A, and may approve data transmission or reception through channels, the number of which corresponds to the parameter. In an exemplary embodiment, the memory system 200 includes a temperature sensor, and the channel arbitration module 211 selects one of the parameter tables that is appropriate based on a temperature output by the temperature sensor, and checks a parameter corresponding to the selected parameter table to determine which channels it should approve data transmission or reception through.

Although use of a plurality of parameter tables by the channel arbitration module 211 according to temperature ranges to manage power considering the temperature of a memory system has been described with reference to FIG. 2B, embodiments of the inventive concept are not limited thereto. For example, the channel arbitration module 211 may manage power according to a method of correcting an existing parameter table by using a reference temperature and a current temperature.

FIG. 3 is a table showing information about the operation statuses of a plurality of memory chips according to an exemplary embodiment of the inventive concept.

Referring to FIG. 3, operation status information representing the operation statuses of eight memory chips Chip 1 through Chip 8 included in a memory device may be checked. Although eight memory chips have been illustrated and described with reference to FIG. 3, more or less memory chips than the eight memory chips may be implemented.

According to an exemplary embodiment, information about the operation statuses of memory chips may include one or more bits. For example, when the operation status information has a value of three or more bits for each memory chip, each of the values may represent at least one of a first program operation, a second program operation, a read operation, an erase operation, and an idle state.

Referring to FIG. 3, a first chip Chip 1 and an eighth chip Chip 8 from among the eight memory chips Chip 1 through Chip 8 are performing the first program operation PG, a fourth chip Chip 4 is performing the read operation RD, and the remaining chips, namely, second, third, fifth, sixth, and seventh chips Chip 2, Chip 3, Chip 5, Chip 6, and Chip 7, are in an idle state (e.g., ID).

Figure 4A:
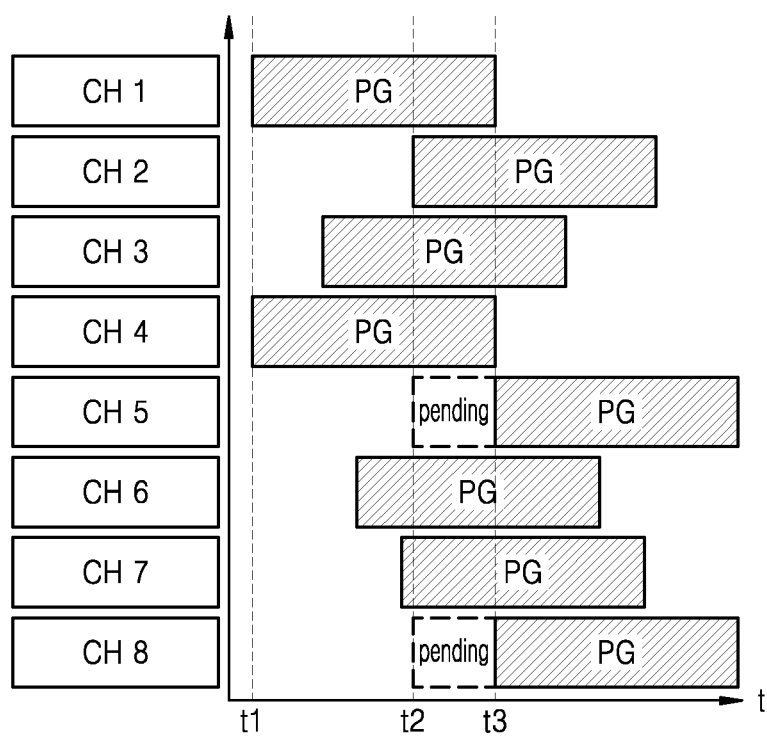
FIGS. 4A through 4C illustrate a method of scheduling data transmission or reception of channels for each operation of a memory chip according to an exemplary embodiment of the inventive concept.
Figure 4B:
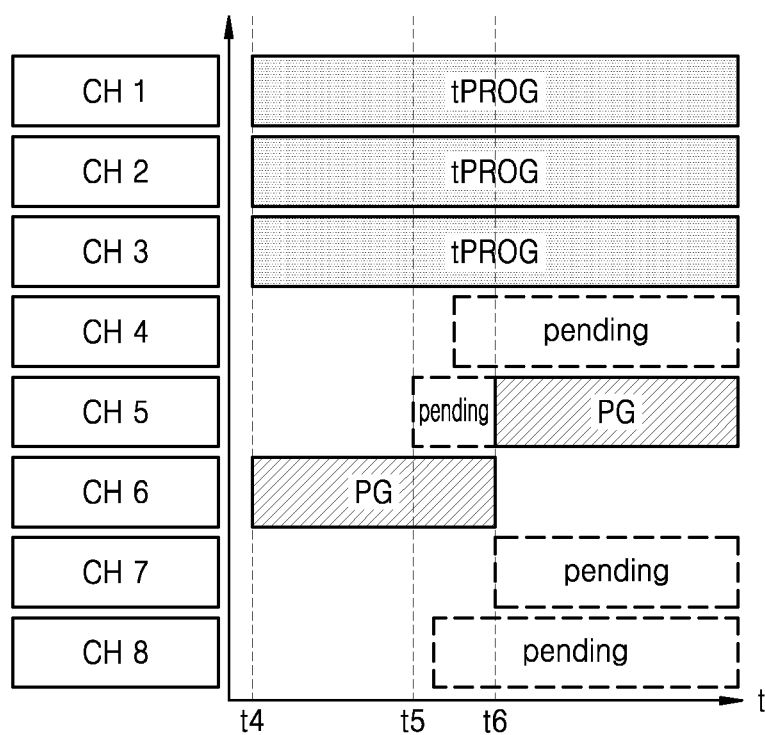
Figure 4C:
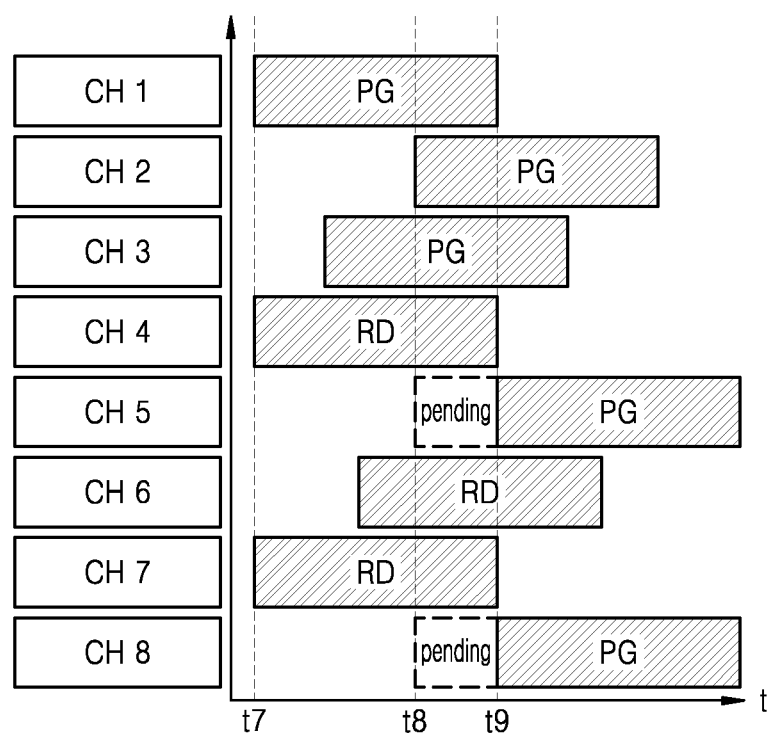

FIGS. 4A through 4C illustrate a method of scheduling data transmission or reception of channels for each operation of a memory chip. FIGS. 4A through 4C illustrate transmission of a command for each of a plurality of channels, namely, first through eighth channels CH1 through CH8, according to time. The descriptions given with reference to FIGS. 1 through 3 are equally applicable to the present embodiment.

FIG. 4A illustrates an embodiment in which a plurality of memory chips perform the first program operation PG. When the channel arbitration module 211 according to an exemplary embodiment of the inventive concept checks that the memory chips are performing the first program operation PG, the channel arbitration module 211 may check parameter table Table A to determine X1 as the parameter corresponding to the first program operation PG. The channel arbitration module 211 may approve data transmission or reception through channels, the number of which corresponds to parameter X1.

For example, when parameter X1 corresponding to the first program operation PG is 6, the channel arbitration module 211 may approve transmission or reception through a total of 6 channels. Referring to FIG. 4A, the channel arbitration module 211 receives a request signal for requesting approval of transmission or reception through the first channel CH1 and the fourth channel CH4, at a first time point t1. Because there are no channels corresponding to a memory chip performing the first program operation PG at the first time point t1, the channel arbitration module 211 may approve transmission or reception through the first channel CH1 and the fourth channel CH4. The channel arbitration module 211 may sequentially approve transmission or reception through the third channel CH3, the sixth channel CH6, the seventh channel CH7, and the second channel CH2, between the first time point t1 and the second time point t2. The memory chips corresponding to channels via which transmission or reception have been approved may perform the first program operation PG.

Because a total of 6 channels correspond to a memory chip performing the first program operation PG at the second time point t2, the channel arbitration module 211 does not approve transmission or reception through the fifth channel CH5 and the eighth channel CH8. Accordingly, transmission of a command via the fifth channel CH5 and the eighth channel CH8 is pending.

The channel arbitration module 211 may determine that the first program operations PG of the memory chips corresponding to the first channel CH1 and the fourth channel CH4 have been completed at the third time point t3. In other words, because a total of 4 channels correspond to a memory chip performing the first program operation PG at the third time point t3, the channel arbitration module 211 may approve transmission or reception of the fifth channel CH5 and the eighth channel CH8, which are the channels via which command transmission has been pending. For example, the channel arbitration module 211 may approve transmission or reception of the fifth channel CH5 and the eighth channel CH8 at or after the third time point t3.

FIG. 4B illustrates an embodiment in which a plurality of memory chips performs the first program operation PG and the second program operation tPROG. When the channel arbitration module 211 according to an embodiment of the inventive concept determines that memory chips are performing the second program operation tPROG, the channel arbitration module 211 may check parameter table Table A to determine X2 and W1 as the parameters corresponding to the second program operation tPROG. The channel arbitration module 211 may approve transmission or reception of data associated with the first program operation PG for channels, the number of which corresponds to the checked parameter X2, and may approve transmission or reception of data associated with the second program operation tPROG for channels, the number of which corresponds to the checked parameter W1.

For example, when parameter X2 corresponding to the second program operation tPROG is 1 and parameter W1 corresponding to the second program operation tPROG is 3, the channel arbitration module 211 may approve transmission or reception of data associated with the first program operation PG for a total of one channel and may approve transmission or reception of data associated with the second program operation tPROG for a total of three channels.

Referring to FIG. 4B, because there are no channels corresponding to a memory chip performing the second program operation tPROG at the fourth time point t4, the channel arbitration module 211 may approve transmission or reception of the first through third channels CH1 through CH3. Because there are no channels corresponding to a memory chip performing the first program operation PG at the fourth time point t4, the channel arbitration module 211 may approve transmission or reception of the sixth channel CH6.

Because a total of one channel corresponds to a memory chip performing the first program operation PG between the fifth and sixth time points t5 and t6, the channel arbitration module 211 does not approve transmission or reception through the fourth, fifth, seventh, and eighth channels CH4, CH5, CH7, and CH8. Accordingly, command transmission via the fourth channel CH4, the fifth channel CH5, the seventh channel CH7, and the eighth channel CH8 are pending.

The channel arbitration module 211 determines that the first program operation PG of the memory chip corresponding to the sixth channel CH6 has been completed at the sixth time point t6. In other words, because no channels correspond to a memory chip performing the first program operation PG at the sixth time point t6, the channel arbitration module 211 may approve transmission or reception through one of the channels via which command transmission have been pending. The channel arbitration module 211 may approve transmission or reception through the channels in which command transmission have been pending, according to the order in which a request signal for requesting approval of transmission or reception is received. For example, the channel arbitration module 211 may first approve transmission or reception of the fifth channel CH5 corresponding to a first-received request signal from among the fourth channel CH4, the fifth channel CH5, the seventh channel CH7, and the eighth channel CH8, which are the channels via which command transmission have been pending.

FIG. 4C illustrates an embodiment in which a plurality of memory chips perform the first program operation PG and the read operation RD. When the channel arbitration module 211 according to an embodiment of the inventive concept determines that the memory chips are performing the first program operation PG and the read operation RD, the channel arbitration module 211 may check the parameter table Table A to determine X4 and Z3 as the parameters corresponding to the first program operation PG and the read operation RD. In an exemplary embodiment, the channel arbitration module 211 determines at a certain time that memory chips are performing the first program operation PG and the read operation RD when at least one of the memory chips is already running the first program operation PG as of the certain time and at least one of the memory chips is already running the read operation RD as of the certain time. The channel arbitration module 211 may approve transmission or reception of data associated with the first program operation PG through channels, the number of which corresponds to the checked parameter X4, and may approve transmission or reception of data associated with the read operation RD through channels, the number of which corresponds to the checked parameter Z3.

For example, when parameter X4 corresponding to the first program operation PG is 3 and parameter Z3 is 3, the channel arbitration module 211 may approve transmission or reception through a total of 6 channels. Referring to FIG. 4C, the channel arbitration module 211 receives a request signal for requesting approval of transmission or reception through the first channel CH1, the fourth channel CH4, and the seventh channel CH7 at a time point t7. Because there are no channels corresponding to a memory chip performing the first program operation PG or the read operation RD at the first time point t1, the channel arbitration module 211 may approve transmission or reception through the first channel CH1, the fourth channel CH4, and the seventh channel CH7. The channel arbitration module 211 may sequentially approve transmission or reception through the third channel CH3, the sixth channel CH6 and the second channel CH2, between the time point t7 and a time point t8. Thus, three memory chips have been approved to perform the first program operation PG and three other memory chips have been approved to perform the read operation.

Because a total of 6 channels correspond to a memory chip performing the first program operation PG and the read operation RD at the time point t8, the channel arbitration module 211 does not approve transmission or reception through the fifth channel CH5 and the eighth channel CH8. Accordingly, transmission of a command via the fifth channel CH5 and the eighth channel CH8 is pending.

The channel arbitration module 211 may determine that the read operations corresponding to the channel CH4 and CH7 have been completed at time point t9. In other words, because a total of 4 channels correspond to a memory chip performing the first program operation PG and/or the read operation RD at time point t9, the channel arbitration module 211 may approve transmission or reception of the fifth channel CH5 and the eighth channel CH8, which are the channels via which command transmission has been pending. For example, the channel arbitration module 211 may approve transmission or reception of the fifth channel CH5 and the eighth channel CH8 at or after the time point t9.

Figure 5:
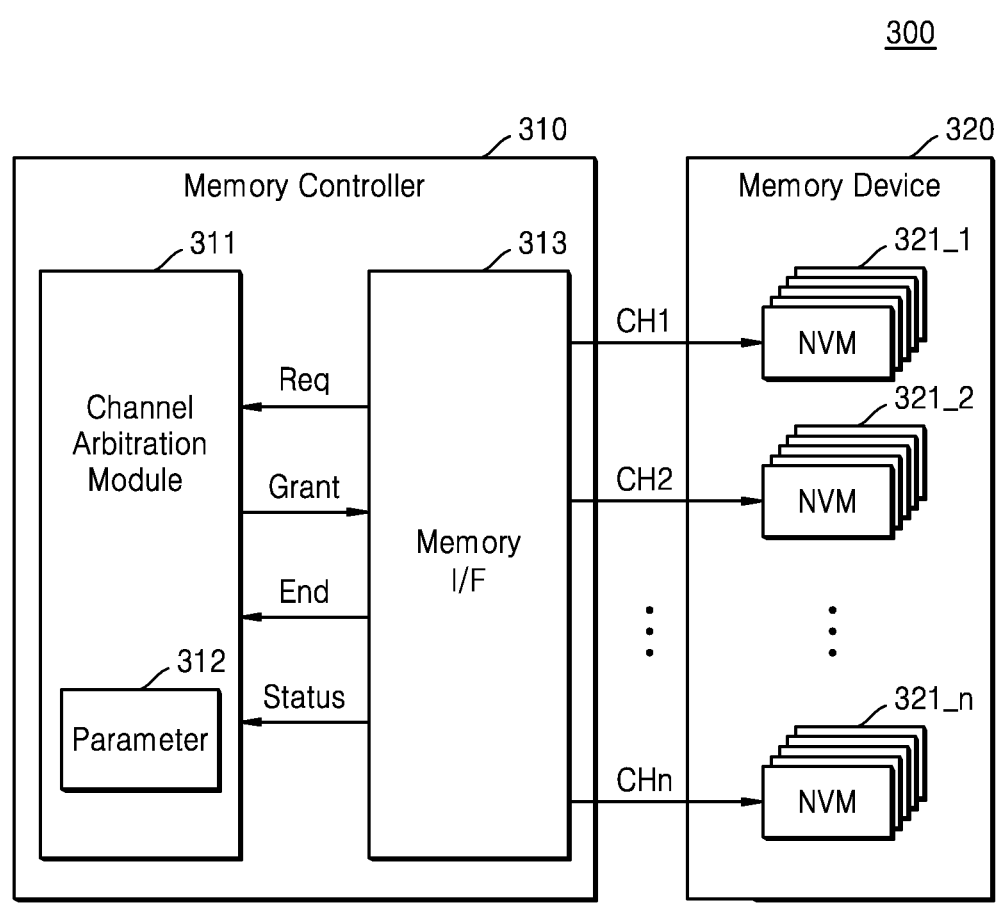
FIG. 5 is a block diagram of a memory system according to an exemplary embodiment of the inventive concept.

FIG. 5 is a block diagram of a memory system 300 according to an exemplary embodiment of the inventive concept.

Referring to FIGS. 1 through 5, the memory system 300 includes a memory controller 310 (e.g., a control circuit) and a memory device 320, and the memory controller 310 includes a channel arbitration module 311 and a memory interface (I/F) 313 (e.g., an interface circuit) and the memory device 320 may include n memory chips 321_1 through 321_n. The channel arbitration module 311 may correspond to the channel arbitration module 211 of FIG. 1.

The memory I/F 313 may transmit or receive data via the n channels CH1 through CHn respectively connecting the memory controller 310 to the n memory chips 321_1 through 321_n of the memory device 320. The memory I/F 313 may queue commands CMD for each of the n channels CH1 through CHn, and may transmit or receive the command CMD or the data DATA via the n channels CH1 through CHn, under the control of the memory controller 310. For example, the memory I/F 313 may include a buffer that temporarily stores the commands CMD until they are executed.

According to an exemplary embodiment of the inventive concept, the memory I/F 313 transmits to the channel arbitration module 311 the request signal Req for requesting approval of transmission or reception through the first channel CH1, before transmitting the queued commands CMD through the first channel CH1. When receiving from the channel arbitration module 311 a grant signal Grant corresponding to the request signal Req, the memory I/F 313 may transmit or receive the queued commands CMD and the data DATA related with the queued commands CMD via the first channel CH1. On the other hand, when not receiving from the channel arbitration module 311 the grant signal Grant corresponding to the request signal Req, the memory I/F 313 defers transmission or reception via the first channel CH1.

According to an exemplary embodiment of the inventive concept, the channel arbitration module 311 receives the request signal Req from the memory I/F 313. In response to the request signal Req, the channel arbitration module 311 may obtain information Status about the respective operation statuses of the n memory chips 321_1 through 321_n. The information Status about the respective operation statuses of the n memory chips 321_1 through 321_n may indicate in which operation state each of the n memory chips 321_1 through 321_n is from among the first program operation, the second program operation, the read operation, the erase operation, and the idle state.

The channel arbitration module 311 may obtain the information Status about the respective operation statuses of the n memory chips 321_1 through 321_n from the memory I/F 313 via various methods. For example, the channel arbitration module 311 may send a request (e.g., a signal) to the memory I/F 313 for the information Status about the respective operation statuses in response to the request signal Req, and may receive the information Status about the respective operation statuses from the memory I/F 313 in response to the sent request. Alternatively, the channel arbitration module 311 may continuously receive signals representing the respective operation statuses of the n memory chips 321_1 through 321_n from the memory I/F 313 via a specific hardware component, and may generate the information Status about the respective operation statuses by using the signals in response to the request signal Req. Alternatively, the channel arbitration module 311 may periodically receive information about an operation status from the memory I/F 313, regardless of the request signal Req.

The channel arbitration module 311 may determine whether the first channel CH1 is approved, based on the information Status about the respective operation statuses of the n memory chips 321_1 through 321_n and a parameter 312 set based on the power consumption for each operation of a memory chip. The parameter 312 may include different parameters for each operation of the memory chip or a combination of operations thereof. For example, as in the above-described examples of FIG. 2A or FIG. 2B, the parameter 312 may be the maximum number of memory chips capable of performing a program operation, a read operation, or an erase operation within an allowed power amount, and may be the maximum number of memory chips capable of performing the operations included in each combination of a program operation, a read operation, and an erase operation within the allowed power amount.

The parameter 312 may be stored in a memory (not shown) or a buffer (not shown) within the memory controller 310 and read therefrom by the channel arbitration module 311, or may be stored in a memory (not shown) within the channel arbitration module 311. The channel arbitration module 311 or the memory controller 310 may calculate the parameter 312 by using the power consumption for each operation and store the calculated parameter 312.

As an example of determining approval or disapproval of the first channel CH1 by using the information Status about the respective operation statuses of the n memory chips 321_1 through 321_n and the parameter 312, the channel arbitration module 311 may first determine a parameter corresponding to a current operation of the memory chips 321_1 through 321_n from the parameter 312, based on the information Status about the respective operation statuses of the memory chips 321_1 through 321_n. For example, when the channel arbitration module 311 determines that the memory chips 321_1 through 321_n performs the first program operation, the channel arbitration module 311 may determine a parameter corresponding to the first program operation.

The channel arbitration module 311 may compare the determined parameter with the information Status about the respective operation statuses of the n memory chips 321_1 through 321_n and thus may determine whether the number of memory chips that are currently operating has reached the maximum number. When the number of memory chips that are currently operating does not reach the maximum number, the overall power consumption does not exceed the allowed power amount even when a memory chip additionally performs operations for the queued commands CMD, and thus, the channel arbitration module 311 determines to approve the first channel CH1. On the other hand, when the number of memory chips that are currently operating reaches the maximum number, the channel arbitration module 311 determines not to approve the first channel CH1, in order to prevent the overall power consumption from exceeding the allowed power amount.

The channel arbitration module 311 may transmit a result of the determination to the memory I/F 313. For example, when the channel arbitration module 311 determines to approve the first channel CH1, the channel arbitration module 311 transmits a grant signal Grant to the memory I/F 313. On the other hand, when the channel arbitration module 311 determines not to approve the first channel CH1, the channel arbitration module 311 does not transmit the grant signal Grant to the memory I/F 313.

According to an exemplary embodiment of the inventive concept, the memory I/F 313 transmits an end signal End other than the request signal Req to the channel arbitration module 311. For example, when an operation of one of the memory chips 321_1 through 321_n has ended, the memory I/F 313 transmits the end signal End to the channel arbitration module 311. In response to the end signal End, the channel arbitration module 311 may again determine approval or disapproval of the first channel CH1. For example, when the first channel CH1 has already been determined to be not approved in response to the request signal Req, since an operation of one of the memory chips 321_1 through 321_n has ended, the channel arbitration module 311 re-determines whether the overall power consumption does not exceed the allowed power amount even when the operations corresponding to the commands CMD queued for the first channel CH1 are performed. When the channel arbitration module 311 has already transmitted the grant signal Grant for the first channel CH1 in response to the request signal Req, the operation of re-determining approval or disapproval of the first channel CH1 may be omitted. An operation, performed by the channel arbitration module 311, of determining approval or disapproval of the first channel CH1 in response to the end signal End is substantially the same as the above-described operation of determining approval or disapproval of a first channel, and thus, a redundant description thereof is omitted.

Figure 6:
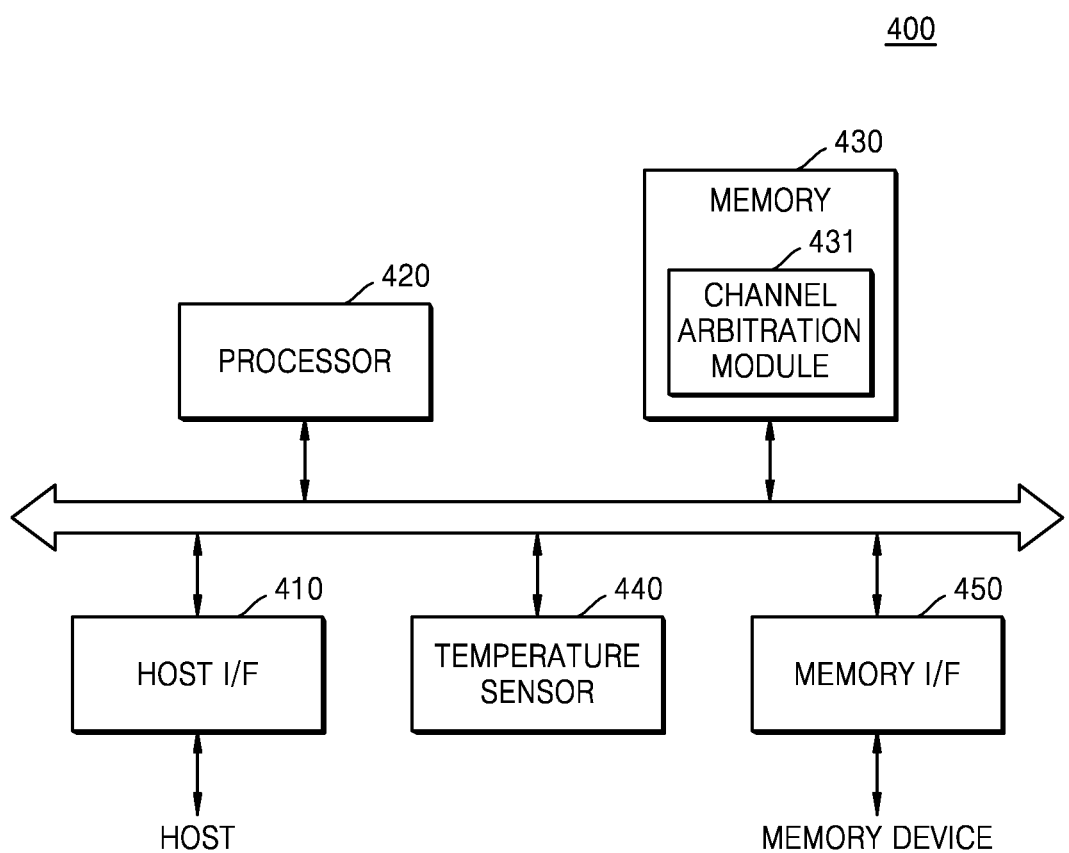
FIG. 6 is a block diagram of a memory controller according to an exemplary embodiment of the inventive concept.

FIG. 6 is a block diagram of a memory controller 400 according to an exemplary embodiment of the inventive concept.

Referring to FIGS. 1 through 6, the memory controller 400 may include a host I/F 410 (e.g., a circuit), a processor 420, a memory 430, a temperature sensor 440 (e.g., a thermocouple), and a memory I/F 450. The memory 430 includes a channel arbitration module 431. The channel arbitration module 431 may correspond to one of the channel arbitration modules 211, and 311 of FIGS. 1, and 5.

The host I/F 410 may communicate with a host HOST (e.g., a host device) via various I/Fs. According to an embodiment, the host IF 410 may communicate with the host HOST via various I/Fs such as Universal Serial Bus (USB), MultiMediaCard (MMC), PCIExpress (PCI-E), AT Attachment (ATA), Serial AT Attachment (SATA), Parallel AT Attachment (PATA), Small Computer System Interface (SCSI), Serial Attached SCSI (SAS), Enhanced Small Disk Interface (ESDI), and Integrated Drive Electronics (IDE). For example, the host I/F may implement a non-volatile memory express (NVMe), which is an I/F optimized for a memory system such as an SSD.

According to an exemplary embodiment of the inventive concept, the host I/F 410 receives specification information of the host HOST from the host HOST. The specification information may include, for example, information about an apparatus type, model information, and information about a required power consumption amount of a memory system. The pieces of information included in the specification information are not limited thereto.

The channel arbitration module 431 may set a parameter, based on the received specification information of the host HOST. For example, because the allowed power amount may vary according to the type of the host HOST, the channel arbitration module 431 may set a parameter, based on an allowed power amount corresponding to the specification information of the host HOST. For example, channel arbitration module 431 may set a different parameter for each host it receives specification information.

The processor 420 may include a CPU or a microprocessor, and may control an overall operation of the memory controller 400 by executing instructions stored in the memory 430. FIG. 6 illustrates one processor 420. However, embodiments of the inventive concept are not limited thereto as the memory controller 400 may include a plurality of processors 420.

The memory 430 may operate under the control of the processor 420, and may be implemented as a volatile memory such as dynamic random-access memory (DRAM) or static random-access memory (SRAM) or may be implemented as a non-volatile memory such as phase-change random-access memory (PRAM) or flash memory. The channel arbitration module 431 may be implemented as firmware or software, and may be loaded in the memory 430. Although the channel arbitration module 431 is loaded in the memory 430 in FIG. 6, embodiments of the inventive concept are not limited thereto. For example, the channel arbitration module 431 may be loaded in a memory (not shown) located outside the memory controller 400, and may be arranged as a special component implemented as hardware inside or outside the memory controller 400.

The temperature sensor 440 may sense a temperature. According to an exemplary embodiment, the temperature sensor 440 is arranged within the memory controller 400 to sense an ambient temperature, and outputs as temperature information, a voltage corresponding to the sensed temperature. Although the temperature sensor 440 is included in the memory controller 400 in FIG. 6, embodiments of the inventive concept are not limited thereto. For example, the temperature sensor 440 may be arranged inside a memory device or near the memory device and may sense an ambient temperature around the memory device. FIG. 6 illustrates one temperature sensor 440. However, according to another embodiment, the memory controller 400 includes a plurality of temperature sensors 440.

According to an exemplary embodiment of the inventive concept, the channel arbitration module 431 sets different parameters according to different temperature ranges. Because the allowed power amount may vary according to the temperature of a memory system, the channel arbitration module 431 may set different parameters according to allowed power amounts respectively corresponding to different temperature ranges. For example, when the temperature is relatively high, the channel arbitration module 431 may set a parameter, based on a relatively low allowed power amount. In an exemplary embodiment, the channel arbitration module 431 sets a first parameter based on a first allowed power amount when the temperature is a first temperature value and sets a second parameter based on a second allowed power amount when the temperature is a second temperature value, where the first allowed power amount is lower than the second allowed power amount when the first temperature value is higher than the second temperature value.

When the channel arbitration module 431 receives a request signal for requesting approval of transmission or reception through a specific channel from the memory I/F 450, the channel arbitration module 431 may obtain temperature information from the temperature sensor 440 and may obtain information about the respective operation statuses of a plurality of memory chips of the memory device. The channel arbitration module 431 may determine a parameter corresponding to the temperature of the memory system from among a plurality of parameters by using the obtained temperature information, and may schedule transmission or reception of data through a plurality of channels by using the determine parameter and the operation statuses of the plurality of memory chips of the memory device. In FIG. 6, the memory controller 400 includes the temperature sensor 440. However, according to another embodiment, the temperature sensor 440 is omitted.

According to an exemplary embodiment of the inventive concept, a parameter may be set by further taking into account specification information of a host or temperature information in addition to power consumption for each operation of a memory chip, and data transmission or reception of the plurality of channels may be controlled using a parameter conforming to a situation (e.g., conditions or states) of the memory system, leading to more optimized power management of the memory system.

Figure 7:
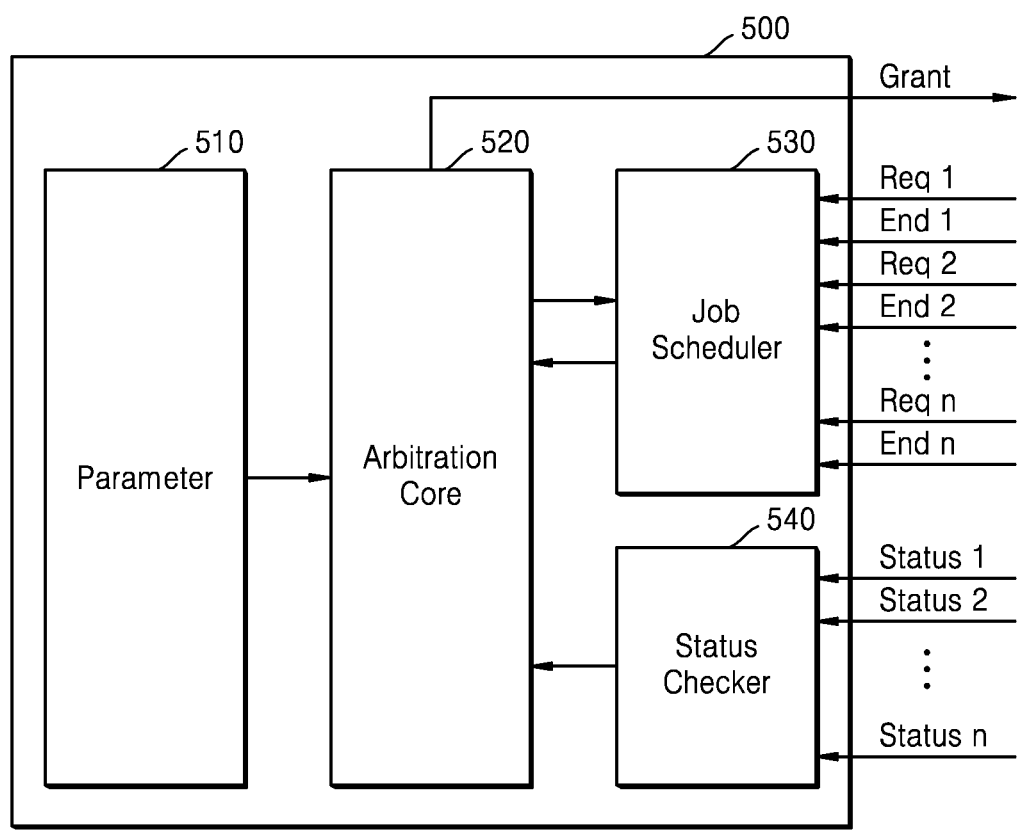
FIG. 7 is a block diagram of a channel arbitration module according to an exemplary embodiment of the disclosure.

FIG. 7 is a block diagram of a channel arbitration module 500 according to an exemplary embodiment of the disclosure.

Referring to FIGS. 1 through 7, the channel arbitration module 500 includes a parameter 510, an arbitration core 520, a job scheduler 530, and a status checker 540. The parameter 510 is substantially the same as the parameter 312 of FIG. 5, and thus a detailed description thereof will be omitted. When the channel arbitration module 500 is implemented as hardware or partially hardware, the job scheduler 530 and/or the status checker 540 could each be implemented by a logic circuit.

According to an embodiment of the inventive concept, a memory I/F may transmit request signals Req 1 through Req n for the commands queued for channels respectively corresponding to n memory chips to the channel arbitration module 500. When an operation of each of the n memory chips has ended, the memory I/F may transmit end signals End 1 through End n to the channel arbitration module 500. Each of a request signal and an end signal may include information about the number (or an identifier) of a corresponding memory chip or a command (or a memory operation) for the corresponding memory chip. For example, the identifier may uniquely identify a specific one of the memory chips. For example, the information about the command may indicate the type of operation that completed, such as whether the operation was a read operation RD, a first program operation PG, etc.

When the job scheduler 530 receives the request signals Req 1 through Req n or the end signals End 1 through End n for the n memory chips from the memory I/F, the job scheduler 530 may generate a job schedule by using the received request signals Req 1 through Req n or the received end signals End 1 through End n.

For example, when the job scheduler 530 receives a plurality of request signals from the memory I/F, the job scheduler 530 may generate a job schedule for jobs corresponding to the plurality of request signals according to the order in which the request signals are received. When the job scheduler 530 receives at least one end signal from the memory I/F, the job scheduler 530 may delete a job corresponding to the received end signal from the job schedule. A method, performed by the job scheduler 530, of generating the job schedule will be described in detail later with reference to FIGS. 8A and 8B.

The status checker 540 may generate operation status information of each of the n memory chips. For example, the status checker 540 may receive signals Status 1 through Status n representing the respective operation statuses of the n memory chips from the memory I/F via a specific hardware component, and may generate information about the operation statuses by using the received signals Status 1 through Status n. The status checker 540 may provide the generated information about the operation statuses to the arbitration core 520.

The arbitration core 520 may determine a channel to be approved to perform which transmission or reception, from among a plurality of channels. For example, when the arbitration core 520 receives the job schedule from the job scheduler 530, the arbitration core 520 may recognize the necessity to determine a channel to be approved to perform which transmission or reception from among the plurality of channels, and thus, may receive the information about the operation statuses from the status checker 540. The arbitration core 520 may receive a parameter corresponding to the operation statuses from the parameter 510, based on the received information about the operation statuses. The arbitration core 520 may check channels, the number of which corresponds to the received parameter, according to the order of the job schedule. For example, each job in the job schedule may correspond to a different operation that is scheduled to be performed using a particular channel. When there is a channel that has not yet received a grant signal Grant among the checked channels, the arbitration core 520 may transmit the grant signal Grant to the channel.

For example, when the arbitration core 520 determines based on the information about the operation statuses that an operation currently performed by current memory chips is the first program operation, the arbitration core 520 may check the parameter table of FIG. 2A to determine a parameter X1 corresponding to the first program operation. The arbitration core 520 may sequentially check X1 channels performing the first program operation according to the order of the job schedule. When there is a channel that has not yet received a grant signal Grant among the checked X1 channels, the arbitration core 520 may transmit the grant signal Grant to the channel.

In FIG. 7, the channel arbitration module 500 includes the status checker 540. However, according to another embodiment, the status checker 540 is omitted. In this case, the channel arbitration module 500 may indirectly check the operation statuses of the memory chips. For example, the channel arbitration module 500 may infer, based on command information included in the job schedule, an operation status of a memory chip determined to be included in the job schedule and to have received a grant signal Grant. The channel arbitration module 500 may also infer that a memory chip included in the job schedule but having received no grant signals Grant is in an idle state. Alternatively, the channel arbitration module 500 may infer the operation status of the memory chip by using a state in which the jobs requested from the host HOST are queued.

According to an exemplary embodiment of the inventive concept, the channel arbitration module 500 generates the job schedule and determines approval or disapproval of transmission or reception of a channel according to the order of the generated job schedule, thereby sequentially scheduling the plurality of channels even when operations of the plurality of memory chips are anticipated.

Figure 8A:
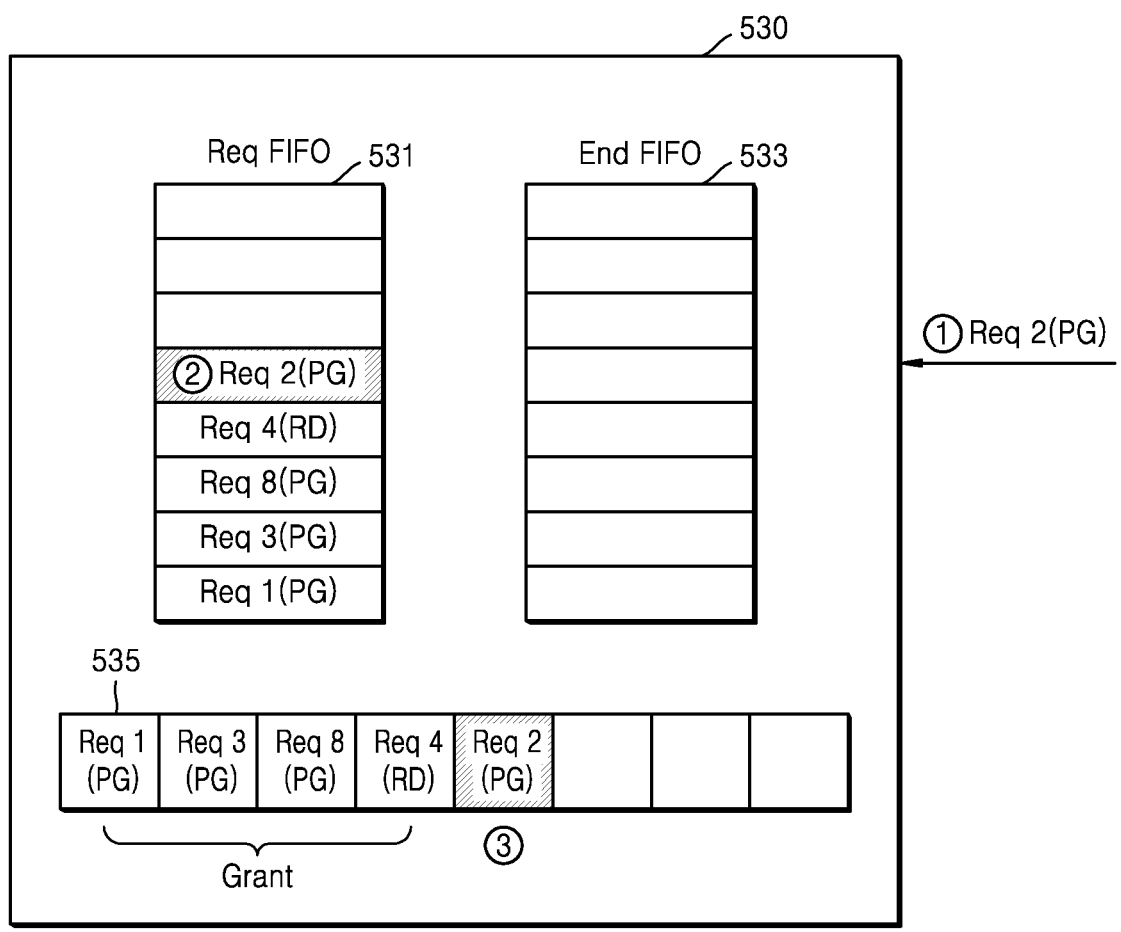
FIGS. 8A and 8B illustrate a method of generating a job schedule, according to an exemplary embodiment of the inventive concept.
Figure 8B:
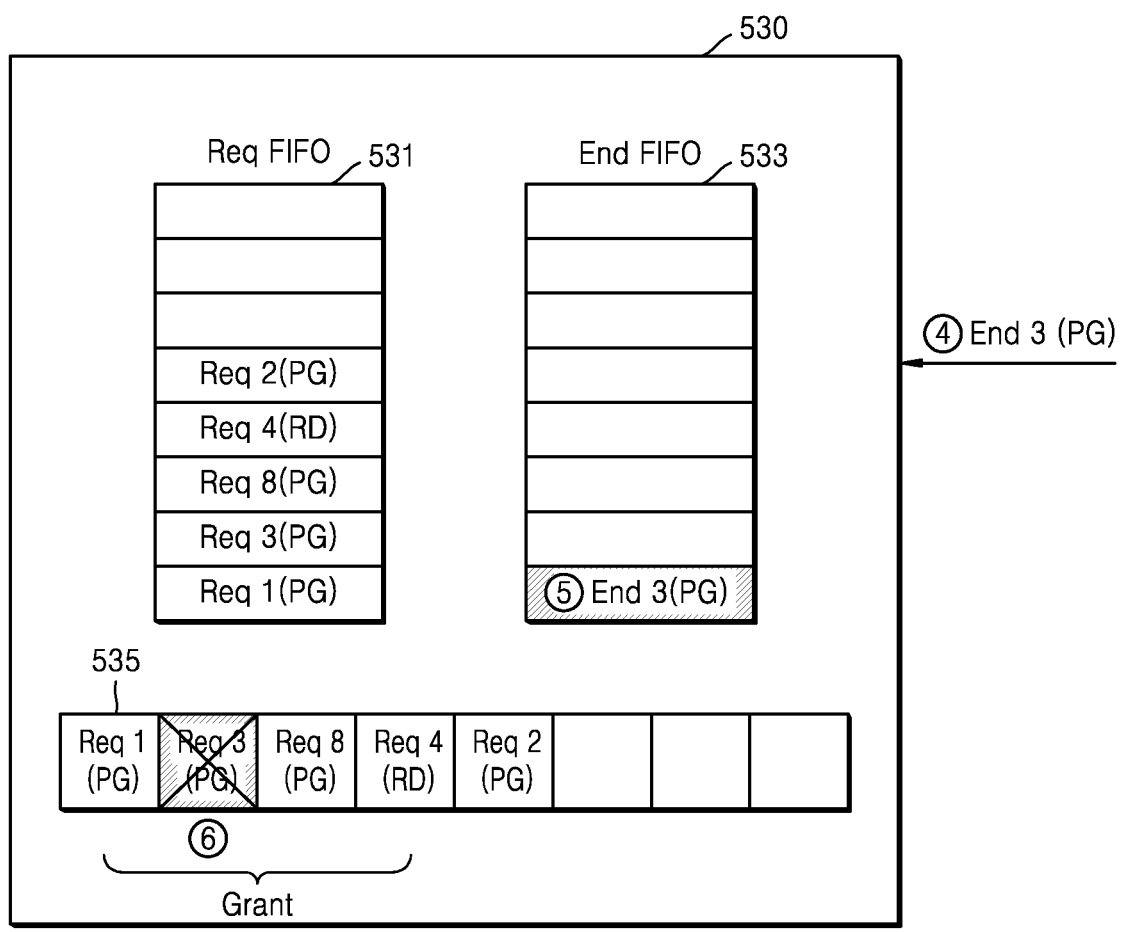

FIGS. 8A and 8B illustrate a method of generating a job schedule, according to an embodiment of the inventive concept.

The job scheduler 530 of FIG. 7 according to an embodiment of the inventive concept may input request signals to a First In First Out (FIFO) 531 according to the order in which the request signals are received from the memory I/F. The job scheduler 530 may input end signals to a FIFO 533 according to the order in which the end signals are received from the memory I/F. The job scheduler 530 may generate a job schedule 535 by using the FIFO 531 for request signals and the FIFO 533 for end signals.

For convenience of explanation, a method is described where the job scheduler 530 generates the job schedule 535 by additionally receiving a request signal or an end signal, on the premise of a situation where a plurality of request signals Req 1, Req 3, Req 8, and Req 4 have been input to the FIFO 531 and a job schedule has been generated in the order of Req 1, Req 3, Req 8, and Req4.

Referring to FIG. 8A, the job scheduler 530 receives the second request signal Req 2 from the memory I/F (①), and inputs the second request signal Req 2 to the FIFO 531 for request signals (②). The job scheduler 530 may generate the job schedule 535 by using a method such as a linked list or a search tree. For example, the job scheduler 530 sequentially retrieves request signals from the FIFO 531 for request signals, checks whether the retrieved request signals are included in the existing job schedule 535, and creates a new request signal (or entry) in the job schedule 535 for each retrieved request signal not already in the existing job schedule 535. In other words, the job scheduler 530 inserts the second request signal Req 2, which is the new request signal, from the FIFO 531 for request signals, in the job schedule 535 (③). The job scheduler 530 may provide the job schedule 535 generated in this way to the channel arbitration module 500.

The channel arbitration module 500 may receive the information about the operation statuses from the status checker 540 in response to the reception of job schedule 535, and may determine, based on the received information about the operation statuses, that the current memory chips are performing the first program operation PG and the read operation RD. The channel arbitration module 500 may determine the above-described parameters X4 and Z3 from checking the table of FIG. 2A as parameters corresponding to the checked operations.

For example, the parameters X4 and Z3 may be each 3. The channel arbitration module 500 may check, based on the information about the operation statuses or the transmission history of the grant signal Grant, that the memory chips corresponding to the first request Req 1, the third request Req 3, the eighth request Req 8, and the fourth request Req 4 have already been performing operations in response to the grant signal Grant. Accordingly, the channel arbitration module 500 may determine approval or disapproval of transmission or reception of a channel corresponding to the second request Req 2, which has not yet received the grant signal Grant according to the order of the job schedule 535. Because three channels are currently performing the first program operation PG, the channel arbitration module 500 determines to not approve the transmission or reception of the channel corresponding to the second request Req 2.

Referring to FIG. 8B, the job scheduler 530 receives the third end signal End 3 from the memory I/F (④), and inputs the third end signal End 3 to the FIFO 533 for end signals (⑤). The job scheduler 530 may sequentially retrieve end signals from the FIFO 533 for end signals, and may delete request signals corresponding to the retrieved end signals from the request signals included in the job schedule 535. For example, the job scheduler 530 may retrieve the third end signal End 3, which is a new end signal, from the FIFO 533 for end signals and may delete the third request signal Req 3 (or an entry associated with the request signal) included in the job schedule 535 (⑥). Although not shown in FIG. 8B, the job scheduler 530 may delete the third request signal Req 3 and the third end signal End 3 from the FIFO 531 for request signals and the FIFO 533 for end signals. The job scheduler 530 may provide the job schedule 535 generated in this way to the channel arbitration module 500.

The channel arbitration module 500 may receive the information about the operation statuses from the status checker 540 in response to the job schedule 535, and may check, based on the received information about the operation statuses, that the current memory chips are performing the first program operation PG and the read operation RD. The channel arbitration module 500 may determine the above-described parameters X4 and Z3 from the table of FIG. 2A as parameters corresponding to the checked operations.

For example, the parameters X4 and Z3 may be each 3. The channel arbitration module 500 may check, based on the information about the operation statuses or the transmission history of the grant signal Grant, that the memory chips corresponding to the first request Req 1, the eighth request Req 8, and the fourth request Req 4 are performing operations in response to the grant signal Grant. Accordingly, the channel arbitration module 500 may re-determine approval or disapproval of transmission or reception of a channel corresponding to the second request Req 2, which has not yet received the grant signal Grant according to the order of the job schedule 535. Because two channels are currently performing the first program operation PG, the channel arbitration module 500 determines to approve transmission or reception of the channel corresponding to the second request Req 2.

Figure 9:
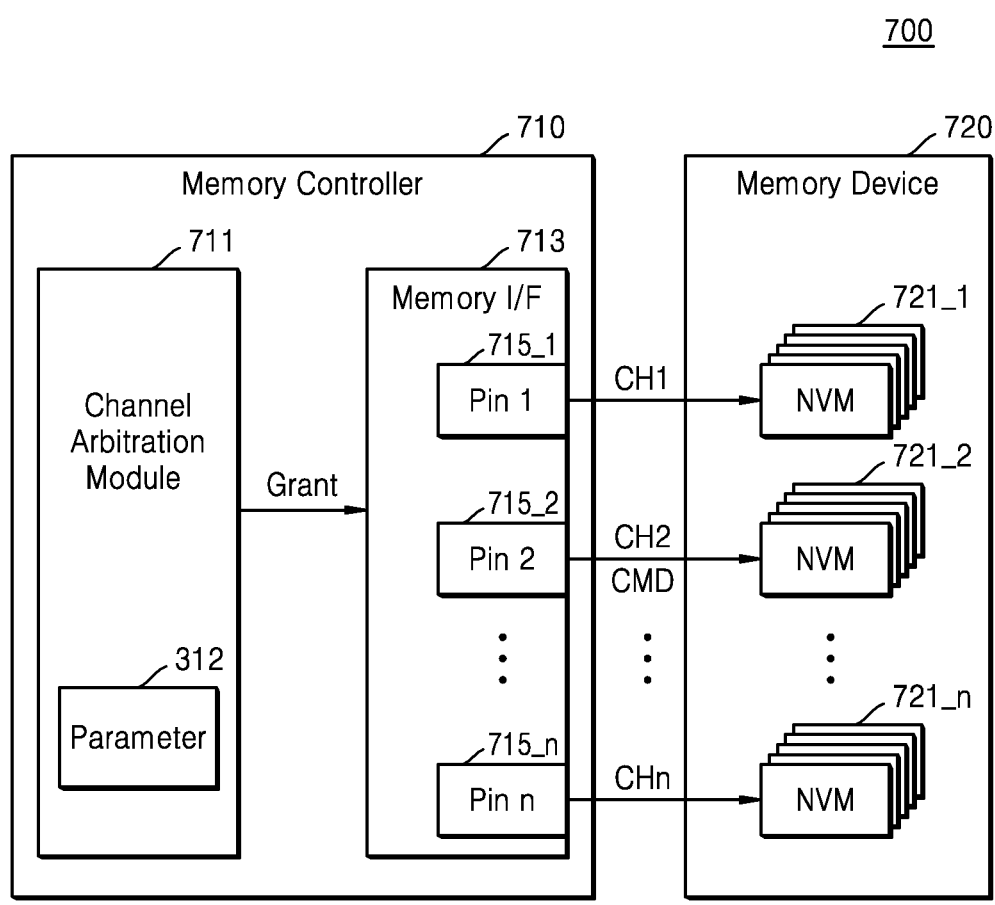
FIG. 9 is a block diagram illustrating a method of scheduling data transmission or reception of a channel, according to an exemplary embodiment of the inventive concept.

FIG. 9 is a block diagram illustrating a method of scheduling data transmission or reception of a channel, according to an exemplary embodiment of the inventive concept.

Referring to FIGS. 1 through 9, a memory system 700 includes a memory controller 710 and a memory device 720, and the memory controller 710 includes a channel arbitration module 711 and a memory I/F 713. The memory device 720 may include n memory chips 721_1 through 721_$n$, namely, first through n-th memory chips 721_1 through 721_$n$. According to an embodiment, the memory I/F 713 include n pins 715_1 through 715_$n$, namely, first through n-th pins 715_1 through 715_$n$, for channels that connect the n memory chips 721_1 through 721_$n$. The term "pin" may be referred to as a terminal or an output pin according to embodiments.

According to an exemplary embodiment of the inventive concept, the channel arbitration module 711 determines channels to be approved to perform transmission or reception from among a plurality of channels, and determines whether there is a channel having not yet received the grant signal Grant from among the channels to be approved to perform transmission or reception. When there is a channel having not yet received the grant signal Grant, the channel arbitration module 711 may transmit the grant signal Grant to the channel. When the memory I/F 713 receives the grant signal Grant from the channel arbitration module 711, the memory I/F 713 may transmit the queued command CMD for the channel corresponding to the grant signal Grant to the memory device 720 via the channel.

For example, when the channel arbitration module 711 determines the second channel CH2 as the channel having not yet received the grant signal Grant from among the channels via which transmission or reception has been approved, the channel arbitration module 711 transmits the grant signal Grant to the second pin 715_2, and the memory I/F 713 transmits the queued command CMD for the second channel CH2 to the second memory chip 721_2 via the second pin 715_2. The second memory chip 721_2 may perform a memory operation corresponding to the received command, and may transmit data related with the performed memory operation across the second channel CH2 to the memory controller 711 via the second pin 715_2.

Figure 10:
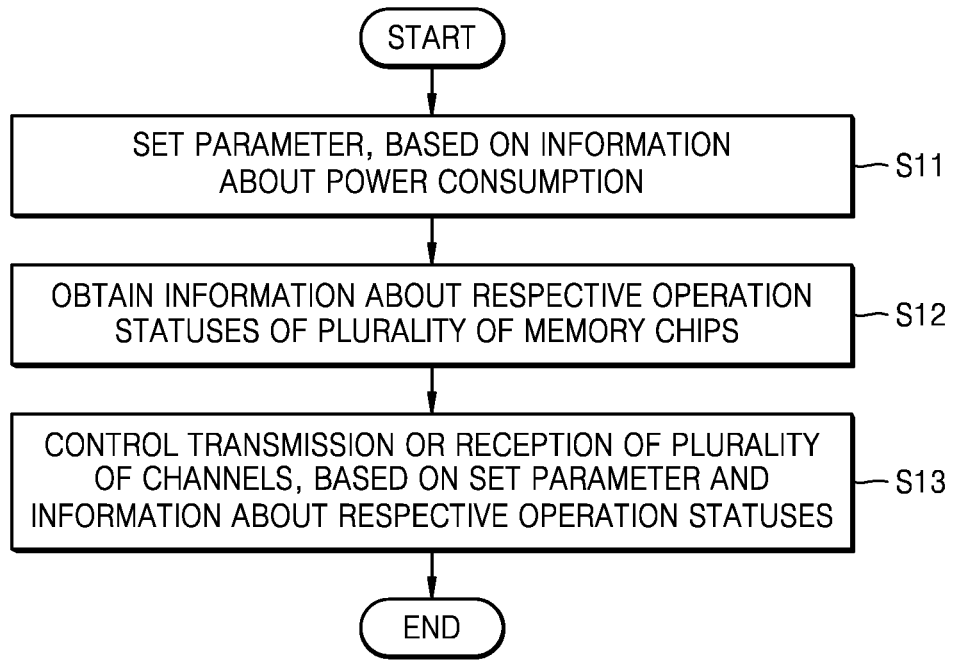
FIG. 10 is a flowchart of a method of scheduling data transmission or reception of a plurality of channels, according to an exemplary embodiment of the inventive concept.

FIG. 10 is a flowchart of a method of scheduling data transmission or reception of a plurality of channels, according to an exemplary embodiment of the inventive concept.

The method of scheduling data transmission or reception of a plurality of channels, according to the present embodiment, may be performed in the memory system 200 of FIG. 1, the memory system 300 of FIG. 5, or the memory system 700 of FIG. 9. The descriptions given with reference to FIGS. 1 through 9 are equally applicable to the present embodiment.

Referring to FIG. 10, a memory system sets a parameter, based on information about power consumption for each operation of a memory chip (S11). The information about power consumption for each operation of a memory chip may include the amount of power consumption of at least one of a program operation, a read operation, an erase operation, and an idle state. The program operation may be divided into detailed operations. For example, the program operation may be divided into a data I/O operation (for convenience of explanation, referred to as a first program operation) and a data write operation (for convenience of explanation, referred to as a second program operation). The first program operation corresponds to an operation in which a program command and data are input to a memory chip through a channel and buffered (e.g., in an I/O buffer included in the memory chip). The second program operation corresponds to an operation in which the buffered data (e.g., buffered in the I/O buffer included in the memory chip) is programmed or written to a memory cell array.

The memory system may set, as a parameter, the number of memory chips capable of performing each memory operation in parallel as along as the overall power consumption does not exceed the preset power amount, namely, the allowed power amount. The memory system may set a parameter for each operation of the memory chip or for each combination of operations of the memory chip.

For example, the memory system may set, as parameters, the number of memory chips capable of performing the first program operation in parallel as long as the overall power consumption does not exceed the allowed power amount, the number of memory chips capable of performing the second program operation in parallel as long as the overall power consumption does not exceed the allowed power amount, the number of memory chips capable of performing the read operation in parallel as long as the overall power consumption does not exceed the allowed power amount, and the number of memory chips capable of performing the erase operation in parallel as long as the overall power consumption does not exceed the allowed power amount. The memory system may set, as parameters, the numbers of memory chips capable of performing, in parallel, the operations included in a combination of the first program operation, the second program operation, the read operation, and the erase operation as long as the overall power consumption does not exceed the allowed power amount.

The memory system may set different parameters according to different temperature ranges of the memory system. For example, when the temperature of the memory system is relatively high, the memory system may set a parameter, based on a relatively low allowed power amount.

The memory system may receive specification information of a host from the host, and may set a parameter, based on the received specification information and the power consumption for each operation of the memory chip. The specification information may include, for example, information about an apparatus type, model information, and information about a required power consumption amount of a memory system. The pieces of information included in the specification information are not limited thereto.

The memory system obtains information about the operation statuses of a plurality of memory chips (S12). An operation status of a memory chip may include at least one of a program operation, a read operation, an erase operation, and an idle state. The memory system controls transmission or reception through the plurality of channels, based on the set parameter and the information about the operation statuses of the plurality of memory chips (S13). For example, the memory system may approve transmission or reception through channels, the number of which corresponds to the parameter. For example, the memory system may approve data transmission or reception through channels, the number of which corresponds to the parameter, including channels corresponding to memory chips understood as currently performing a operation, based on the information about the operation statuses of the plurality of memory chips.

Figure 11:
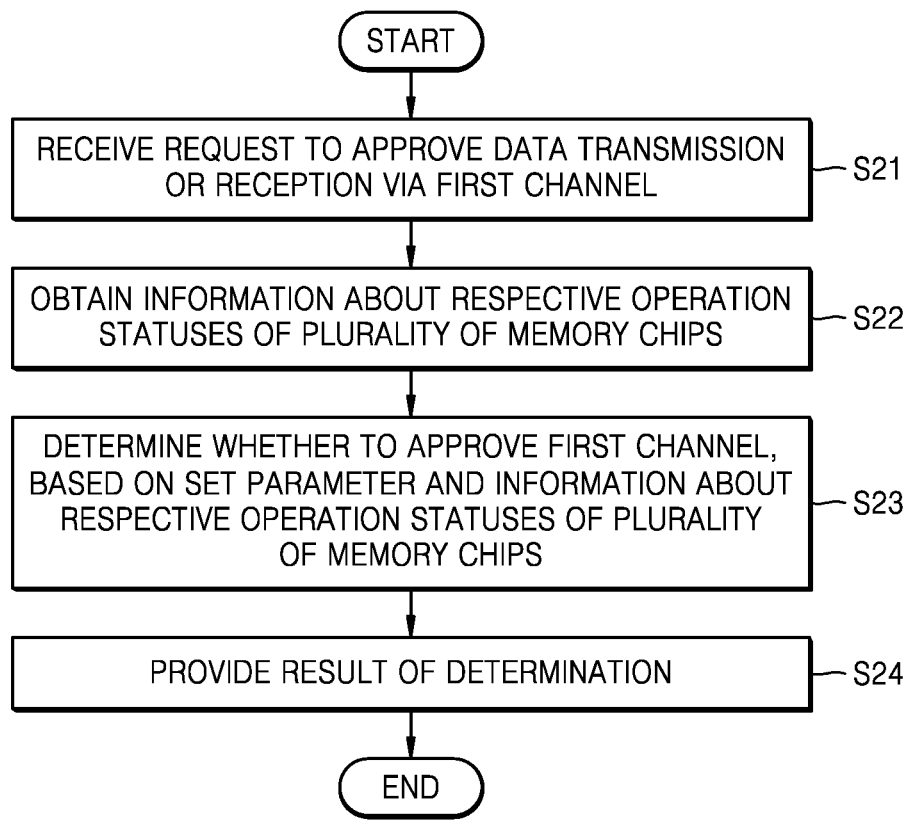
FIG. 11 is a flowchart of a method of scheduling data transmission or reception of a plurality of channels, according to an exemplary embodiment of the inventive concept.

FIG. 11 is a flowchart of a method of scheduling data transmission or reception of a plurality of channels, according to an exemplary embodiment of the inventive concept. In detail, FIG. 11 is a flowchart of an embodiment of operations S12 and S13 of FIG. 10. Operations below may be performed by one of the channel arbitration modules 211, 311, 431, 500, and 711 of FIGS. 1, 5, 6, 7, and 9.

Referring to FIG. 11, a channel arbitration module receives a request to approve data transmission or reception via a first channel (S21). The channel arbitration module obtains information about the operation statuses of a plurality of memory chips (S22). For example, the channel arbitration module may request the information about the operation statuses from a memory I/F in response to the request, and accordingly, may receive the information about the operation statuses from the memory I/F. Alternatively, the channel arbitration module may continuously receive signals representing the respective operation statuses of the plurality of memory chips from the memory I/F via a specific hardware component, and may generate the information about the operation statuses by using the received signals in response to a request. Alternatively, the channel arbitration module may periodically receive the information about the operation statuses from the memory I/F regardless of reception of a request.

The channel arbitration module determines whether to approve the first channel, based on the set parameter and the information about the operation statuses of the plurality of memory chips (S23). The channel arbitration module provides a result of the determination as to whether to approve the first channel, to the memory I/F(S24). When transmission or reception of the first channel is approved, the memory I/F may transmit or receive data to or from a first memory chip via the first channel. When transmission or reception of the first channel is not approved, the memory I/F defers transmission or reception of data via the first channel. Operations S23 and S24 will now be described in greater detail with reference to FIGS. 12 and 13.

Figure 12:
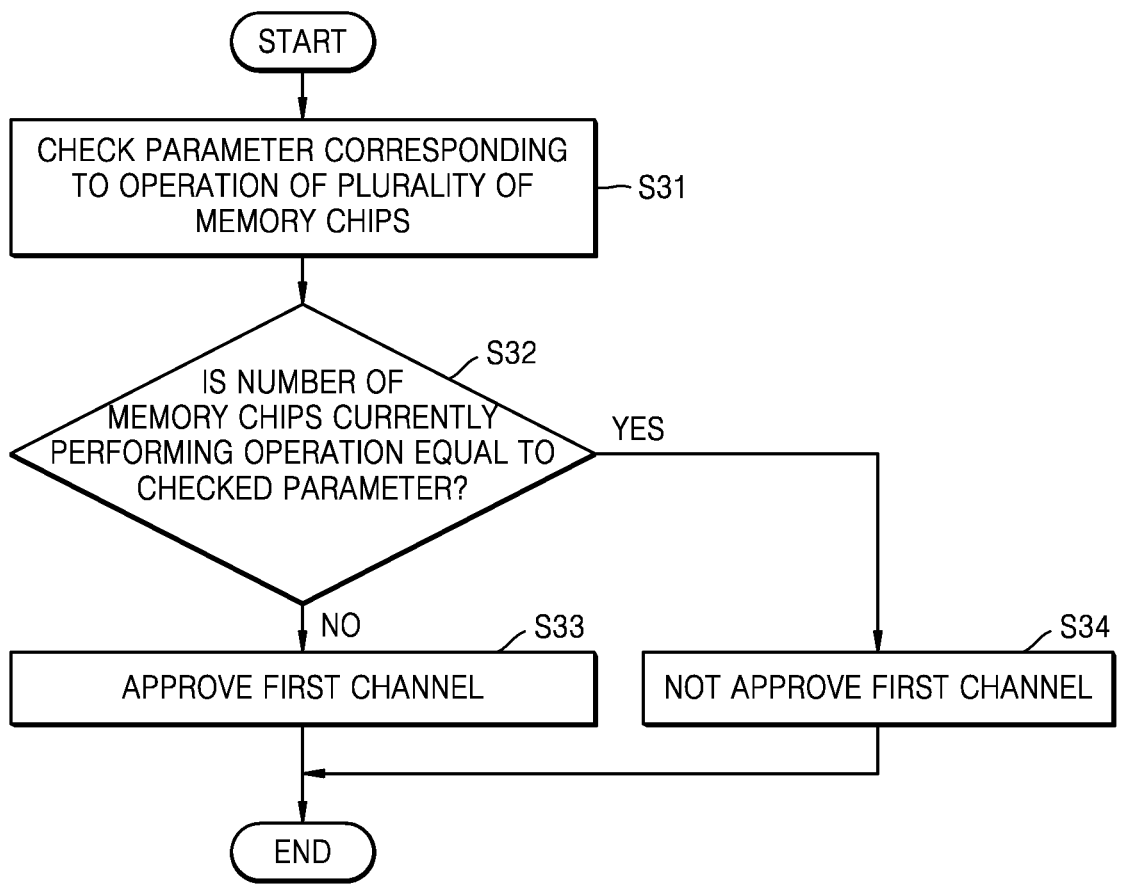
FIG. 12 is a flowchart of a method of determining approval or disapproval of a target channel, according to an exemplary embodiment of the inventive concept.

FIG. 12 is a flowchart of a method of determining approval or disapproval of a target channel, according to an exemplary embodiment of the inventive concept.

In detail, FIG. 12 is a flowchart of an embodiment of operation S23 of FIG. 11. Operations below may be performed by one of the channel arbitration modules 211, 311, 431, 500, and 711 of FIGS. 1, 5, 6, 7, and 9.

Referring to FIG. 12, a channel arbitration module checks a parameter corresponding to an operation of a plurality of memory chips (S31). For example, the channel arbitration module may check what operation the plurality of memory chips are currently performing, based on the information about the operation statuses of the plurality of memory chips. The channel arbitration module may check a parameter corresponding to the checked operation. For example, when the channel arbitration module determines that the plurality of memory chips are performing the first program operation, the channel arbitration module may check a parameter corresponding to the first program operation.

According to an exemplary embodiment, when the channel arbitration module has set different parameters according to different temperature ranges, the channel arbitration module may obtain temperature information of a memory system from a temperature sensor and may check a parameter corresponding to the obtained temperature information.

The channel arbitration module checks whether the number of memory chips performing the checked operation is equal to the checked parameter (S32). When the number of memory chips performing the checked operation is equal to the checked parameter (S32-Y), this may mean that the amount of power consumption by the memory chips currently performing an operation reaches the allowed power amount. Accordingly, to prevent excess of power consumption due to performance of an additional operation of a memory chip, the channel arbitration module determines to not approve the first channel (S34).

On the other hand, when the number of memory chips performing the checked operation is not equal to the checked parameter (S32-N), this may mean that the amount of power consumption by the memory chips currently performing an operation does not reach the allowed power amount. Accordingly, the channel arbitration module determines to approve the first channel (S33).

Figure 13:
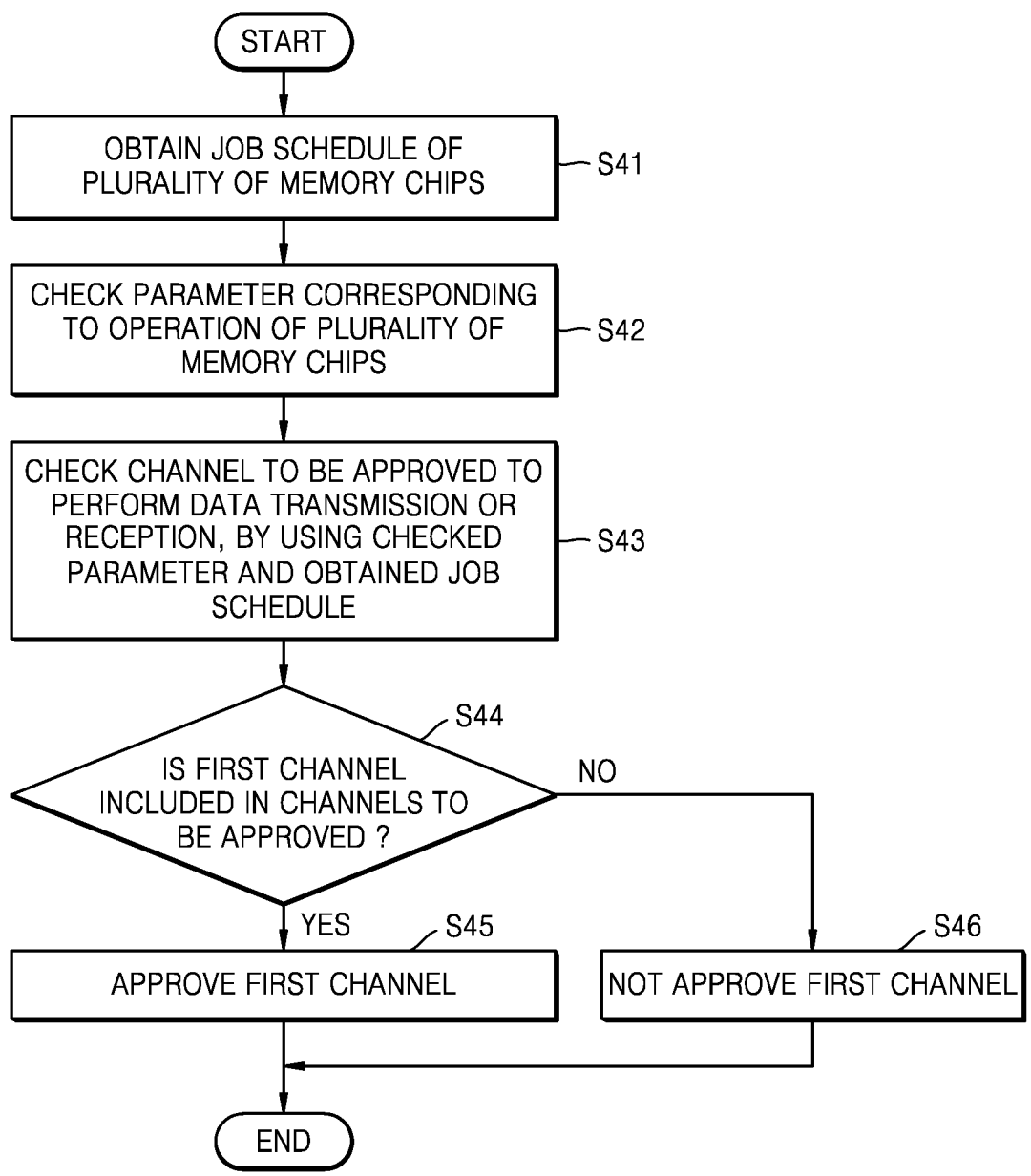
FIG. 13 is a flowchart of a method of determining approval or disapproval of a target channel, according to an exemplary embodiment of the inventive concept.

FIG. 13 is a flowchart of a method of determining approval or disapproval of a target channel, according to an exemplary embodiment of the inventive concept. In detail, FIG. 13 is a modifiable embodiment of FIG. 12.

Referring to FIG. 13, the channel arbitration module obtains a job schedule of a plurality of memory chips (S41). The channel arbitration module may generate the job schedule by using a request signal for requesting transmission or reception of data via a channel corresponding to each of the plurality of memory chips from the memory I/F or an end signal indicating that an operation of each of the plurality of memory chips has been ended.

For example, when the channel arbitration module receives a plurality of request signals from the memory I/F, the channel arbitration module may generate a job schedule for the jobs corresponding to the request signals according to the order in which the request signals are received. When the channel arbitration module receives at least one end signal from the memory I/F, the channel arbitration module may delete a job (or an entry associated with the job) corresponding to the received end signal from the job schedule.

The channel arbitration module checks a parameter corresponding to an operation of a plurality of memory chips (S42).

The channel arbitration module checks channels to be approved to perform data transmission or reception, by using the checked parameter and the job schedule (S43). For example, the channel arbitration module may check the number of channels corresponding to the checked parameter in the order of the job schedule. For example, when the plurality of memory chips perform the first program operation and the value of a parameter corresponding to the first program operation is 3, the channel arbitration module may determine that 3 channels correspond to the first program operation according to the order of the job schedule.

The channel arbitration module checks whether a first channel is included in the channels to be approved (S44). When the first channel is not included in the approved channels (S44-N), the channel arbitration module determines to not approve the first channel (S46). On the other hand, when the first channel is included in the approved channels (S44-Y), the channel arbitration module determines to approve the first channel (S45).

Even when it is determined that the first channel is not approved, the channel arbitration module may re-determine whether to approve data transmission or reception for the first channel, when a preset event occurs. The preset event may be an event where a new request is received from a host and thus the channel arbitration module receives from the memory I/F a request of data transmission or reception for a channel corresponding to the new request. Alternatively, the preset event may be an event where, as an operation of one of the plurality of memory chips has ended, the channel arbitration module receives an end signal from the memory I/F. In this case, the channel arbitration module may update the job schedule by considering a received request signal or end signal, and may re-determine whether to approve data transmission or reception for the first channel, based on the updated job schedule.

Figure 14:
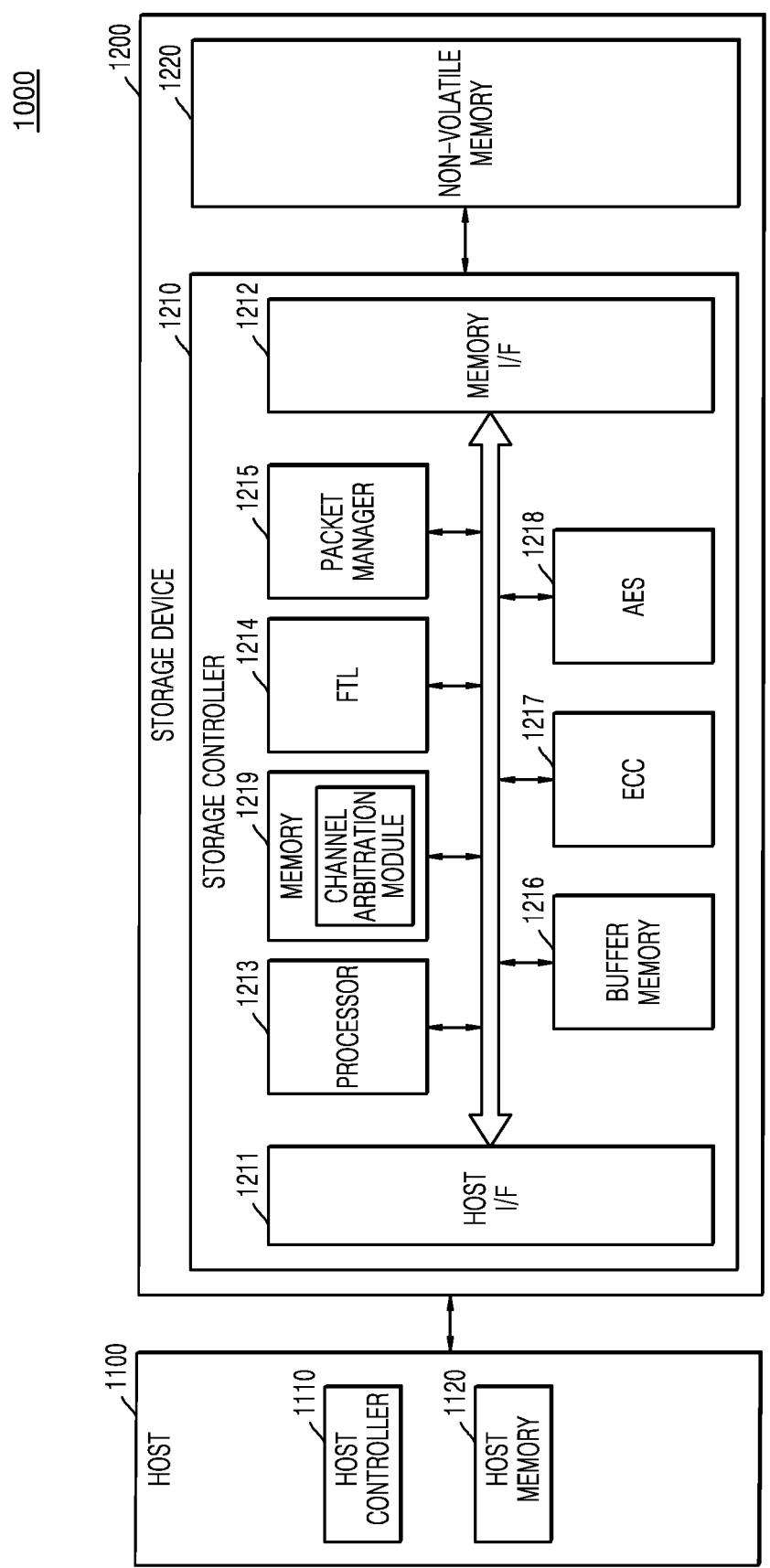
FIG. 14 is a block diagram of a computing system according to an exemplary embodiment of the inventive concept.

FIG. 14 is a block diagram of a computing system 1000 according to an exemplary embodiment of the inventive concept.

Referring to FIG. 14, the computing system 1000 may include a host 1100 and a storage device 1200. For example, the host 1100 may include a host controller 1110 and a host memory 1120. The storage device 1200 may include a storage controller 1210 and a non-volatile memory 1220. The host memory 1120 may function as a buffer memory for temporarily storing data that is to be transmitted to the storage device 1200 or data transmitted by the storage device 1200.

For example, the computing system 1000 may correspond to any of various types of systems such as a server device, a computer, a net-book, a web tablet, a wireless phone, a mobile phone, a smartphone, an e-book, a navigation device, a digital camera, a wearable device, an internet of things (IoT) device, an internet of everything (IoE) device, a virtual reality (VR) device, and an augmented reality (AR) device.

The storage device 1200 may include storage media for storing data according to a request from the host 1100. For example, the storage device 1200 may include at least one of a solid state drive (SSD), an embedded memory, and a detachable external memory. According to the present embodiment, the storage device 1200 may be a memory system corresponding to one of the above-described embodiments. Therefore, the computing system 1000 may control data transmission or reception through a plurality of channels, based on information about the operation statuses of a plurality of chips within the storage device 1200 and information about power consumption for each operation of each memory chip (or a parameter set based on the information about power consumption for each operation), thereby preventing a problem from occurring in the entire system when the entire power consumption exceeds an allowed power level.

The host controller 1110 may manage an operation of storing data of the host memory 1120 (e.g., write data) in the non-volatile memory 1220 or storing data of the non-volatile memory 1220 (e.g., read data) in the host memory 1120.

The storage controller 1210 may include a host I/F 1211, a memory I/F 1212, and a processor 1213. The storage controller 1210 may further include a flash translation layer (FTL) 1214, a packet manager 1215, a buffer memory 1216, an error correction code (ECC) engine 1217, an advanced encryption standard (AES) engine 1218, and a memory 1219. The memory 1219 may include a channel arbitration module. The storage controller 1210 may further include a working memory (not shown) in which the FTL 1214 is loaded, and the processor 1213 may control data writing and reading with respect to the non-volatile memory 1220 by executing the FTL 1214. According to embodiments, the storage controller 1210 may further include a modem (not shown), an I/O device (not shown), a power supply (not shown), etc.

The host I/F 1211 may transmit or receive a packet to or from the host 1100. A packet transmitted by the host 1100 to the host I/F 1211 may include, for example, a command, or data that is to be written to the non-volatile memory 1220, and a packet transmitted by the host I/F 1211 to the host 1100 may include, for example, a response to a command or data read from the non-volatile memory 1220.

The FTL 1214 may perform several functions such as address mapping, wear-leveling, and garbage collection. The address mapping is an operation of changing a logical address received from a host into a physical address for use in actually storing data in the non-volatile memory 1220. The wear-leveling is a technology for preventing excessive deterioration of a specific block by allowing the blocks included in the nonvolatile memory 1220 to be used evenly, and, for example, may be implemented through a firmware technology of balancing erase counts of physical blocks. The garbage collection is a technology for securing usable capacity in the nonvolatile memory 1220 by copying valid data of a block to a new block and then erasing the existing block.

The packet manager 1215 may generate a packet according to the protocol of an I/F negotiated with the host 1100 or parse various pieces of information from a packet received from the host 1100. The buffer memory 1216 may temporarily store data to be written to the non-volatile memory 1220 or data to be read from the non-volatile memory 1220. The buffer memory 1216 may be a component included in the storage controller 1210, but may be disposed outside the storage controller 1210.

The ECC engine 1217 may perform error detection and correction with respect to read data that is read from the non-volatile memory 1220. In more detail, the ECC engine 1217 may generate parity bits with respect to write data to be written to the non-volatile memory 1220, and the generated parity bits may be stored in the non-volatile memory 1220, together with the write data. During data reading from the non-volatile memory 1220, the ECC engine 1217 may correct an error of read data by using parity bits read from the non-volatile memory 1220 together with read data, and may output error-corrected read data.

The AES engine 1218 may perform at least one of encryption and decryption with respect to data that is input to the storage controller 1210, by using a symmetric-key algorithm. In an exemplary embodiment, symmetric-key algorithm uses a same cryptographic key for encryption of plain-text and decryption of cipher-text.

According to an embodiment of the inventive concept, the storage device 1200 may be implemented according to the embodiments described above with reference to FIGS. 1 through 13. For example, the storage controller 1210 may correspond to the memory controller described above with reference to FIGS. 1 through 13, and the non-volatile memory 1220 may correspond to the memory device described above with reference to FIGS. 1 through 13.

For example, the storage controller 1210 may include a channel arbitration module, and may support a function of arbitrating a plurality of channels connected to the non-volatile memory 1220, by using the channel arbitration module. For example, the storage controller 1210 may check operation statuses of a plurality of memory devices included in the non-volatile memory 1220, and may arbitrate a plurality of channels, based on the checked operation statuses and information about power consumption for each operation. A detailed description thereof may be substantially the same as that given above with reference to FIGS. 1 through 13, and thus will be omitted.

Therefore, the computing system 1000 may control data transmission or reception through a plurality of channels, based on information about the operation statuses of a plurality of chips within the storage device 1200 and information about power consumption for each operation of each memory chip (or a parameter set based on the information about power consumption for each operation), thereby preventing a problem from occurring in the entire system when the entire power consumption exceeds an allowed power level.

Figure 15:
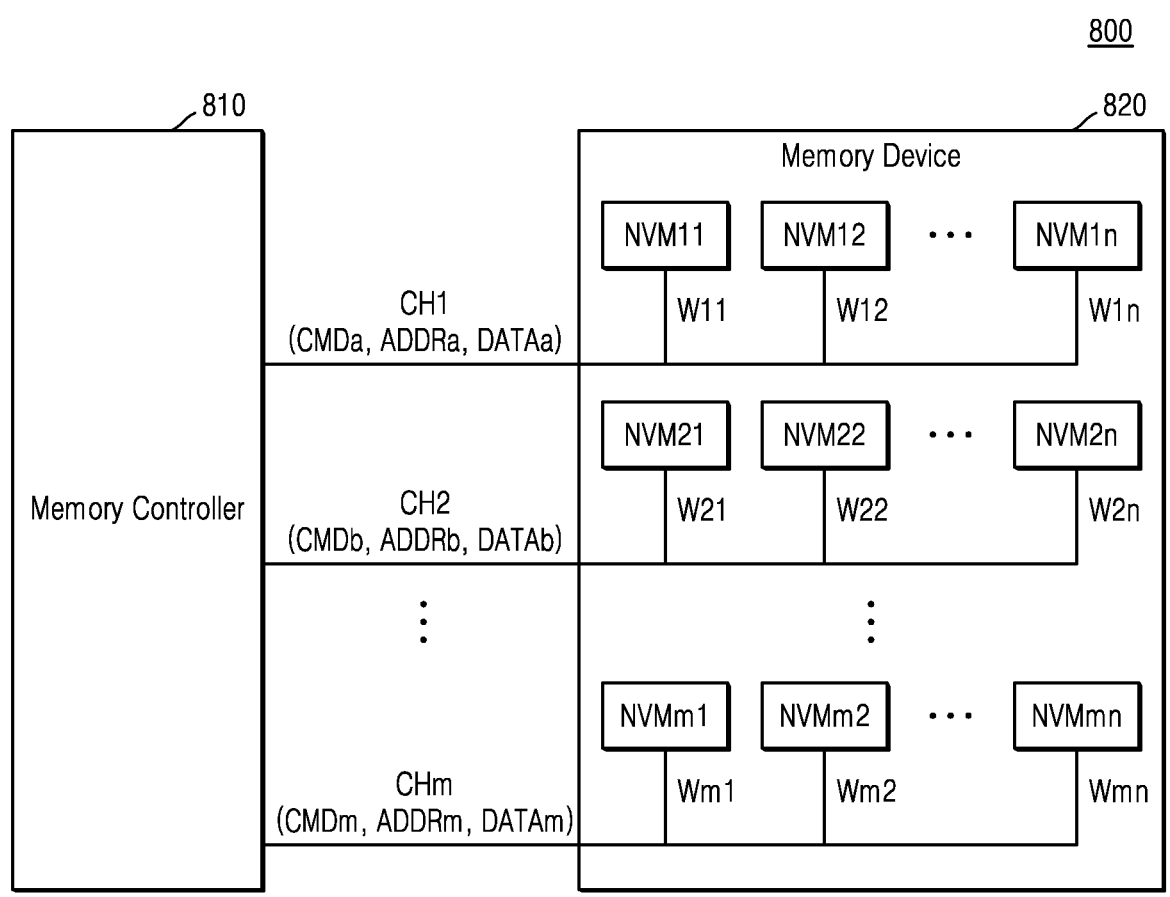
FIG. 15 is a block diagram of a memory system according to an exemplary embodiment of the inventive concept.

FIG. 15 is a block diagram of a memory system 800 according to an embodiment of the inventive concept. Referring to FIG. 15, the memory system 800 may include a memory device 820 and a memory controller 810. The memory system 800 may support a plurality of channels CH1 through CHm, and the memory device 820 and the memory controller 810 may be connected to each other through the plurality of channels CH1 through CHm.

The memory device 820 may include a plurality of non-volatile memories NVM11 through NVMmn. Each of the non-volatile memories NVM11 through NVMmn may be connected to one of the plurality of channels CH1 through CHm through a way corresponding to each of the non-volatile memories NVM11 through NVMmn. For example, the non-volatile memories NVM11 through NVM1n may be connected to the first channel CH1 through ways W11 through W1n, and the non-volatile memories NVM21 through NVM2n may be connected to the second channel CH2 through ways W21 through W2n.

The memory controller 810 may transmit or receive signals to or from the memory device 820 via the plurality of channels CH1 through CHm. For example, the memory controller 810 may transmit commands CMDa through CMDm, addresses ADDRa through ADDRm, and data DATAa through DATAm to the memory device 820 through the plurality of channels CH1 through CHm, or receive the data DATAa through DATAm from the memory device 820.

The memory controller 810 may select one from among non-volatile memories connected to each channel through the channel, and may transmit or receive signals to or from the selected non-volatile memory. For example, the memory controller 810 may select the non-volatile memory device NVM11 from among the non-volatile memories NVM11 through NVM1n connected to the first channel CH1. The memory controller 810 may transmit the command CMDa, the address ADDRa, and the data DATAa to the selected non-volatile memory device NVM11 through the first channel CH1, or receive the data DATAa from the selected non-volatile memory device NVM11.

The memory controller 810 may transmit or receive signals to or from the memory device 820 via different channels in parallel. For example, while transmitting the command CMDa to the memory device 820 through the first channel CH1, the memory controller 810 may transmit the command CMDb to the memory device 820 through the second channel CH2.

Each of the non-volatile memories NVM11 through NVMmn may operate under the control of the memory controller 810. For example, the non-volatile memory device NVM11 may program the data DATAa according to the command CMDa, the address ADDRa, and the data DATAa that are provided through the first channel CH1.

In FIG. 15, the memory device 820 communicates with the memory controller 810 through m channels and includes n non-volatile memory devices for each channel. However, the number of channels and the number of non-volatile memory devices connected to one channel may vary.

According to an embodiment of the inventive concept, the memory system 800 may be implemented according to the above-described embodiments with reference to FIGS. 1 through 14. For example, the memory controller 810 may include a channel arbitration module, and may support a function of arbitrating the plurality of channels CH1 through CHm connected to the non-volatile memory 820, by using the channel arbitration module. For example, the memory controller 810 may check operation statuses of the plurality of memory devices NVM11 through NVMmn of the non-volatile memory 820, and may arbitrate the plurality of channels CH1 through CHm, based on the checked operation statuses and information about power consumption for each operation. A detailed description thereof may be substantially the same as that given above with reference to FIGS. 1 through 14, and thus will be omitted.

Figure 16:
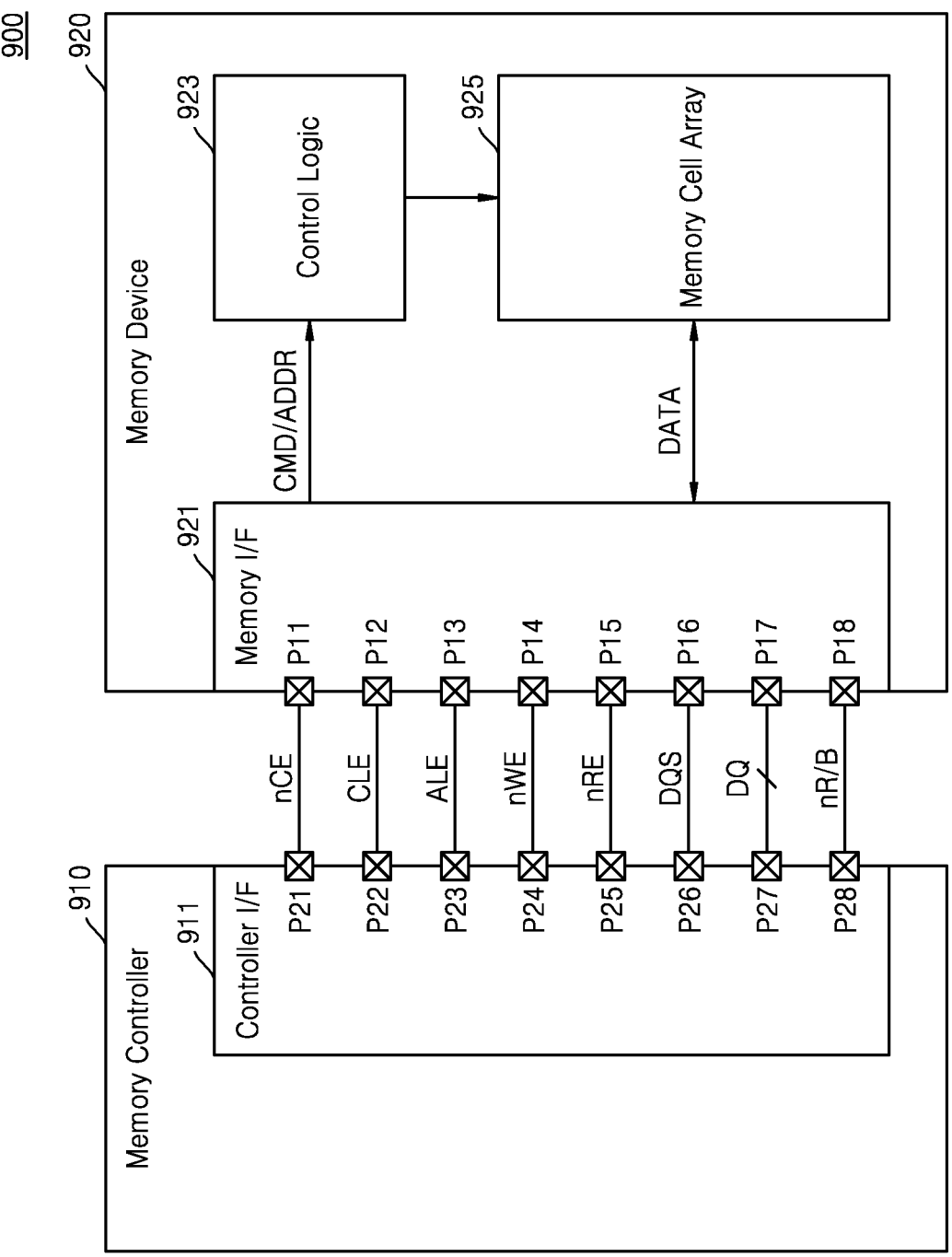
FIG. 16 is a block diagram of a memory system according to an exemplary embodiment of the inventive concept.

FIG. 16 is a block diagram of a memory system 900 according to an embodiment of the inventive concept. Referring to FIG. 16, the memory system 900 may include a memory device 920 and a memory controller 910. The memory device 920 may correspond to one of the non-volatile memories NVM11 through NVMmn that communicates with the memory controller 810, based on one of the plurality of channels CH1 through CHm of FIG. 15. The memory controller 910 may correspond to the memory controller 810 of FIG. 15.

The memory device 920 may include first through eighth pins P11 through P18, a memory I/F circuit 921, a control logic circuit 923, and a memory cell array 925.

The memory I/F circuit 921 may receive a chip enable signal nCE from the memory controller 910 through the first pin P11. The memory I/F circuit 921 may transmit or receive signals to or from the memory controller 910 through the second through eighth pins P12 through P18 according to the chip enable signal nCE. For example, when the chip enable signal nCE is in an enable state (for example, a low level), the memory I/F 921 may transmit or receive signals to or from the memory controller 910 through the second through eighth pins P12 through P18.

The memory I/F circuit 921 may receive a command latch enable signal CLE, an address latch enable signal ALE, and a write enable signal nWE from the memory controller 910 through the second through fourth pins P12 through P14. The memory I/F circuit 921 may receive a data signal DQ from the memory controller 910 through the seventh pin P17, or transmit the data signal DQ to the memory controller 910. A command CMD, an address ADDR, and data DATA may be delivered through the data signal DQ. For example, the data signal DQ may be delivered through a plurality of data signal lines. In this case, the seventh pin P17 may include a plurality of pins corresponding to a plurality of data signals.

The memory I/F circuit 921 may obtain the command CMD from the data signal DQ received in an enable section (for example, a high level state) of the command latch enable signal CLE, based on toggle timings of the write enable signal nWE. The memory I/F circuit 921 may obtain the address ADDR from the data signal DQ received in an enable section (for example, a high level state) of the address latch enable signal ALE, based on toggle timings of the write enable signal nWE.

According to an embodiment, the write enable signal nWE maintains a static (or constant) state (for example, a high level or low level) for a period of time and then toggles between a high level and a low level. For example, the write enable signal nWE may toggle in a section where the command CMD or the address ADDR is transmitted. Accordingly, the memory I/F 921 may obtain the command CMD or the address ADDR, based on the toggle timings of the write enable signal nWE.

The memory I/F circuit 921 may receive a read enable signal nRE from the memory controller 910 through the fifth pin P15. The memory I/F circuit 921 may receive a data strobe signal DQS from the memory controller 910 through the sixth pin P16, or transmit the data strobe signal DQS to the memory controller 910.

In an operation of outputting the data DATA of the memory device 920, the memory I/F 921 may receive the read enable signal nRE toggling through the fifth pin P15, before outputting the data DATA. The memory I/F circuit 921 may generate the data strobe signal DQS that toggles based on toggling of the read enable signal nRE. For example, the memory I/F circuit 921 may generate a data strobe signal DQS that starts to toggle after a predetermined delay (for example, tDQSRE) based on a toggling start time point of the read enable signal nRE. The memory I/F circuit 921 may transmit the data signal DQ including the data DATA, based on toggle timing of the data strobe signal DQS. Accordingly, the data DATA may be aligned with the toggle timing of the data strobe signal DQS and transmitted to the memory controller 910.

In an operation of inputting the data DATA of the memory device 920, when the data signal DQ including the data DATA is received from the memory controller 910, the memory I/F circuit 921 may receive the data strobe signal DQS toggling together with the data DATA from the memory controller 910. The memory I/F circuit 921 may obtain the data DATA from the data signal DQ, based on toggle timing of the data strobe signal DQS. For example, the memory I/F circuit 921 may obtain the data DATA by sampling the data signal DQ at a rising edge and a falling edge of the data strobe signal DQS.

The memory I/F circuit 921 may transmit a ready/busy output signal nR/B to the memory controller 910 through the eighth pin P18. The memory I/F circuit 921 may transmit state information of the memory device 920 to the memory controller 910 through the ready/busy output signal nR/B. When the memory device 920 is in a busy state (i.e., while internal operations of the memory device 920 are being performed), the memory I/F circuit 921 may transmit a ready/busy output signal nR/B representing a busy state to the memory controller 910. When the memory device 920 is in a ready state (i.e., when the internal operations of the memory device 920 are not performed or have been completed), the memory I/F circuit 921 may transmit a ready/busy output signal nR/B representing a ready state to the memory controller 910. For example, while the memory device 920 is reading the data DATA from the memory cell array 925 in response to a page read command, the memory I/F circuit 921 may transmit a ready/busy output signal nR/B indicating a busy state (for example, a low level) to the memory controller 910. For example, while the memory device 920 is programming the data DATA to the memory cell array 925 in response to a program command, the memory I/F circuit 921 may transmit a ready/busy output signal nR/B indicating a busy state to the memory controller 910.

The control logic circuit 923 may control various overall operations of the memory device 920. The control logic circuit 923 may receive the obtained command/address CMD/ADDR from the memory I/F circuit 921. The control logic circuit 923 may generate control signals for controlling other components of the memory device 920 according to the received command/address CMD/ADDR. For example, the control logic circuit 923 may generate various control signals for programming the data DATA to the memory cell array 925 or reading the data DATA from the memory cell array 925.

The memory cell array 925 may store the data DATA obtained from the memory I/F circuit 921, under the control of the control logic circuit 923. The memory cell array 925 may output the stored data DATA to the memory I/F circuit 921 under the control of the control logic circuit 923. The memory controller 910 may include first through eighth pins P21 through P28 and a controller I/F circuit 911. The first through eighth pins P21 through P28 may correspond to the first through eighth pins P11 through P18 of the memory device 920.

The controller I/F circuit 911 may transmit the chip enable signal nCE to the memory controller 920 through the first pin P21. The controller I/F 911 may transmit or receive signals to or from the memory device 920 selected through the chip enable signal nCE, through the second through eighth pins P22 through P28.

The controller I/F circuit 911 may transmit the command latch enable signal CLE, the address latch enable signal ALE, and the write enable signal nWE to the memory device 920 through the second through fourth pins P22 through P24, respectively. The controller I/F circuit 911 may transmit the data signal DQ to the memory device 920 through the seventh pin P27, or receive the data signal DQ from the memory device 920.

The controller I/F circuit 911 may transmit the data signal DQ including the command CMD or the address ADDR, together with the toggling write enable signal nWE, to the memory device 920. The controller I/F circuit 911 may transmit the data signal DQ including the command CMD to the memory device 920 while transmitting the command latch enable signal CLE having an enable state, and may transmit the data signal DQ including the address ADDR to the memory device 920 while transmitting the address latch enable signal ALE having an enable state.

The controller I/F circuit 911 may transmit the read enable signal nRE to the memory device 920 through the fifth pin P25. The controller I/F circuit 911 may receive the data strobe signal DQS from the memory device 920 through the sixth pin P26, or transmit the data strobe signal DQS to the memory device 920.

In an operation of outputting the data DATA of the memory device 920, the controller I/F circuit 911 may generate a read enable signal nRE that toggles, and may transmit the read enable signal nRE to the memory device 920. For example, the controller I/F circuit 911 may generate a read enable signal nRE that changes from a static state (for example, a high level or low level) to a toggle state, before the data DATA is output. Accordingly, the data strobe signal DQS toggling based on the read enable signal nRE may be generated in the memory device 920. The controller I/F circuit 911 may receive the data signal DQ including the data DATA together with the toggling data strobe signal DQS, from the memory device 920. The controller I/F circuit 911 may obtain the data DATA from the data signal DQ, based on toggle timing of the data strobe signal DQS.

In an operation of inputting the data DATA of the memory device 920, the controller I/F 911 may generate the toggling data strobe signal DQS. For example, the controller I/F circuit 911 may generate a data strobe signal DQS that changes from a static state (for example, a high level or low level) to a toggle state, before outputting the data DATA. The controller I/F circuit 911 may transmit the data signal DQ including the data DATA to the memory device 920, based on toggle timings of the data strobe signal DQS.

The controller I/F circuit 911 may receive the ready/busy output signal nR/B from the memory device 920 through the eighth pin P28. The controller I/F circuit 911 may determine state information of the memory device 920, based on the ready/busy output signal nR/B.

Figure 17:
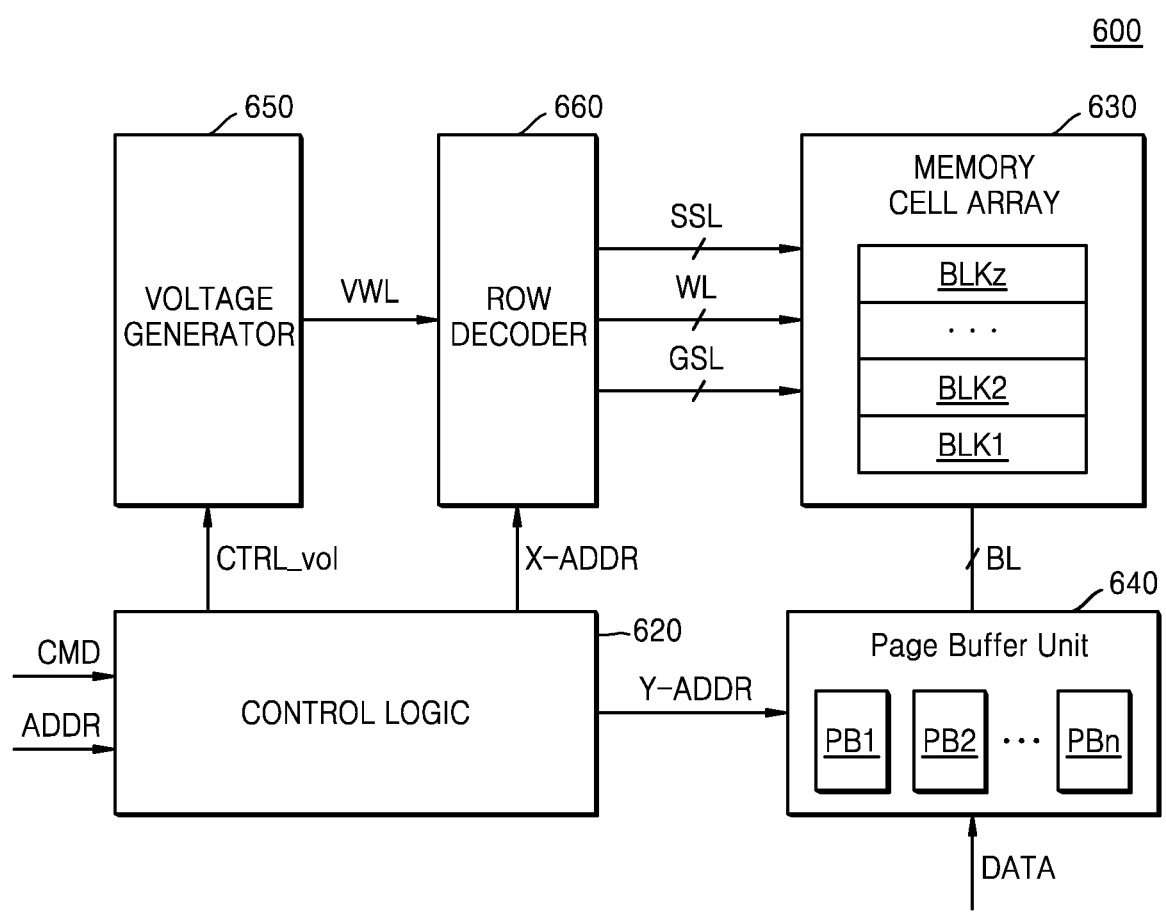
FIG. 17 is a block diagram of a memory device according to an exemplary embodiment of the inventive concept.

FIG. 17 is a block diagram of a memory device 600 according to an embodiment of the inventive concept. Referring to FIG. 17, the memory device 600 may include a control logic circuit 620, a memory cell array 630, a page buffer unit 640, a voltage generator 650, and a row decoder 660. Although not shown in FIG. 17, the memory device 600 may further include the memory I/F circuit 921 of FIG. 16, and may also further include a column logic, a pre-decoder, a temperature sensor, a command decoder, an address decoder, etc. According to an embodiment of the inventive concept, the memory device 600 may correspond to the memory device described above with reference to FIGS. 1 through 16.

The control logic circuit 620 may control various overall operations of the memory device 600. The control logic circuit 620 may output various control signals in response to the command CMD and/or the address ADDR from the memory I/F circuit 921. For example, the control logic circuit 620 may output a voltage control signal CTRL_vol, a row address X-ADDR, and a column address Y-ADDR.

The memory cell array 630 may include a plurality of memory blocks BLK1 through BLKz (where z is a positive integer), and each of the plurality of memory blocks BLK1 through BLKz may include a plurality of memory cells. The memory cell array 630 may be connected to the page buffer unit 640 via bit lines BL, and may be connected to the row decoder 660 via word lines WL, string selection lines SSL, and ground selection lines GSL.

According to an embodiment, the memory cell array 630 may include a three-dimensional (3D) memory cell array, and the 3D memory cell array may include a plurality of NAND strings. Each NAND string may include memory cells respectively connected to word lines vertically stacked on a substrate. According to an embodiment, the memory cell array 630 may include a two-dimensional (2D) memory cell array, and the 2D memory cell array may include a plurality of NAND strings arranged in a column direction and a row direction.

The page buffer unit 640 may include a plurality of page buffers PB1 through PBn (where n is an integer equal to or greater than 3), and the plurality of page buffers PB1 through PBn may be connected to the memory cells via the plurality of bit lines BL, respectively. The page buffer unit 640 may select at least one bit line from the plurality of bit lines BL in response to the column address Y-ADDR. The page buffer circuit 640 may operate as a write driver or a sense amplifier according to operation modes. For example, during a program operation, the page buffer circuit 640 may apply a bit line voltage corresponding to data that is to be programmed to a selected bit line. During a read operation, the page buffer circuit 640 may sense a current or voltage of the selected bit line to sense the data stored in a memory cell. In an alternate embodiment, the page buffer unit 640 may include less than page buffers.

The voltage generator 650 may generate various types of voltages for performing program, read, and erase operations, based on the voltage control signal CTRL_vol. For example, the voltage generator 650 may generate word line voltages VWL, for example, a program voltage, a read voltage, a program verify voltage, and an erase voltage.

The row decoder 660 may select one word line from the plurality of word lines WL in response to the row address X-ADDR, and may select one string selection line from the plurality of string selection lines SSL. For example, during a program operation, the row decoder 660 may apply a program voltage and a program verify voltage to the selected word line, and, during a read operation, the row decoder 660 may apply a read voltage to the selected word line.

Figure 18:
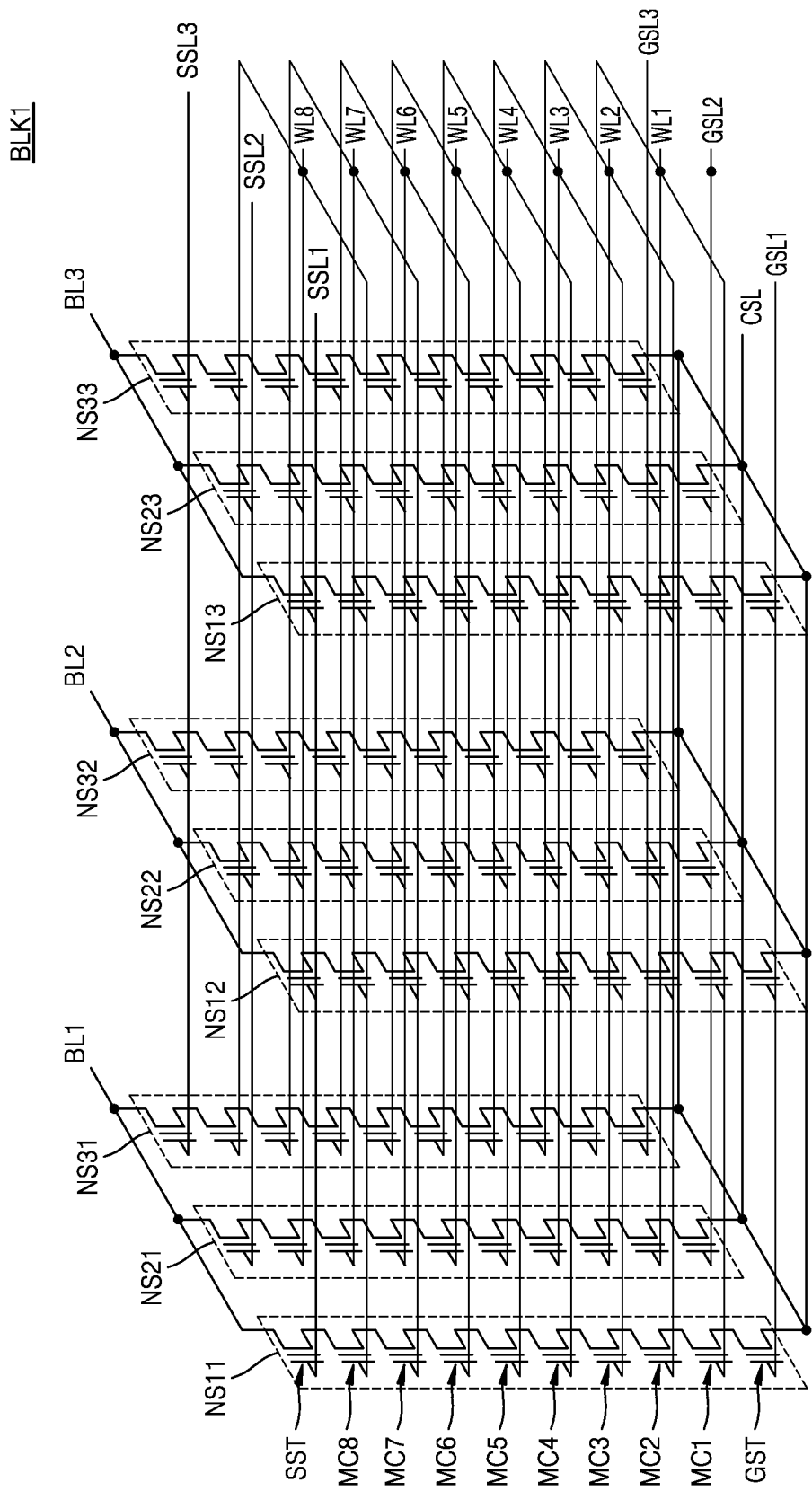
FIG. 18 is a view for explaining a three-dimensional (3D) V-NAND structure according to an exemplary embodiment of the inventive concept.

FIG. 18 is a view for explaining a 3D V-NAND structure according to an embodiment of the inventive concept. When the memory device described above with reference to FIGS. 1 through 17 is implemented using a 3D V-NAND type flash memory, each of a plurality of memory blocks included in the memory device may be represented as an equivalent circuit as shown in FIG. 18.

A memory block BLKi of FIG. 18 represents a 3D memory block that is formed on a substrate to have a 3D structure. For example, a plurality of memory NAND strings included in the memory block BLKi may be formed in a direction perpendicular to the substrate.

Referring to FIG. 18, the memory block BLKi may include a plurality of memory NAND strings NS11 through NS33 connected between bit lines BL1, BL2, and BL3 and a common source line CSL. Each of the plurality of memory NAND strings NS11 through NS33 may include a string select transistor SST, a plurality of memory cells MC1, MC2, through to MC8, and a ground select transistor GST. Although each of the plurality of memory NAND strings NS11 through NS33 includes the eight memory cells MC1, MC2, through to MC8 in FIG. 18, embodiments are not limited thereto.

The string select transistor SST may be connected to a corresponding one of string selection lines SSL1, SSL2, and SSL3. The plurality of memory cells MC1, MC2, through to MC8 may be connected to gate lines GTL1, GTL2, through to GTL8, respectively. The gate lines GTL1, GTL2, through to GTL8 may correspond to word lines, and some of the gate lines GTL1, GTL2, through to GTL8 may correspond to dummy word lines. The ground select transistor GST may be connected to a corresponding one of ground selection lines GSL1, GSL2, and GSL3. The string select transistor SST may be connected to a corresponding one of the bit lines BL1, BL2, and BL3, and the ground select transistor GST may be connected to the common source line CSL.

Word lines (for example, WL1) on the same level may be commonly connected to one another, and the ground selection lines GSL1, GSL2, and GSL3 and the string selection lines SSL1, SSL2, and SSL3 may be separated from one another. Although the memory block BLKi is connected to the eight gate lines GTL1, GTL2, through to GTL8 and the three bit lines BL1, BL2, and BL3 in FIG. 18, embodiments are not limited thereto.

Figure 19:
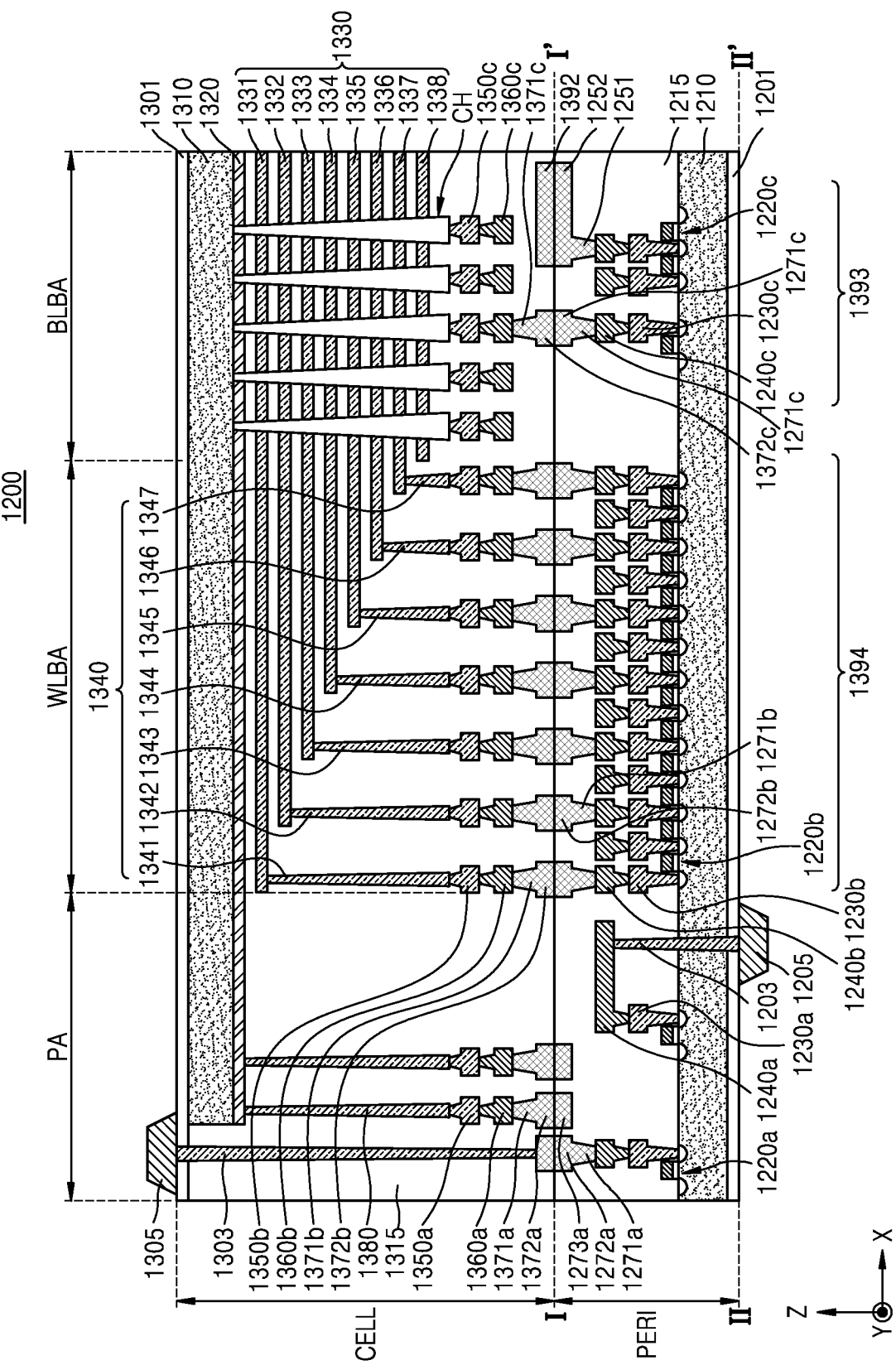
FIG. 19 is a view for explaining a BVNAND structure according to an exemplary embodiment of the inventive concept.

FIG. 19 is a view for explaining a BVNAND structure according to an embodiment of the inventive concept. Referring to FIG. 19, a memory device 1200 may be a chip to chip (C2C) structure. The C2C structure may refer to manufacturing an upper chip including a cell area CELL on a first wafer, manufacturing a lower chip including a peripheral circuit area PERI on a second wafer, and then connecting the upper chip to the lower chip via bonding. For example, the bonding may refer to a method of electrically connecting a bonding metal formed on a topmost metal layer of the upper chip to a bonding metal formed on a topmost metal layer of the lower chip. For example, when the bonding metal is formed of copper (Cu), the bonding may be Cu—Cu bonding, and the bonding metal may be formed of aluminum or tungsten. At least one of the memory devices described above with reference to FIGS. 1 through 17 may be implemented with the C2C structure of FIG. 19.

Each of the peripheral circuit area PERI and the cell area CELL of the memory device 1200 may include an external pad bonding area PA, a word line bonding area WLBA, and a bit line bonding area BLBA.

The peripheral circuit area PERI may include a first substrate 1210, an interlayer insulation layer 1215, a plurality of circuit devices 1220a, 1220b, and 1220c formed on the first substrate 1210, first metal layers 1230a, 1230b, and 1230c connected to the plurality of circuit devices 1220a, 1220b, and 1220c, respectively, and second metal layers 1240a, 1240b, and 1240c formed on the first metal layers 1230a, 1230b, and 1230c. According to an embodiment, the first metal layers 1230a, 1230b, and 1230c may be formed of tungsten having relatively high resistance, and the second metal layers 1240a, 1240b, and 1240c may be formed of copper having relatively low resistance.

In the present specification, only the first metal layers 1230a, 1230b, and 1230c and the second metal layers 1240a, 1240b, and 1240c are illustrated and described. However, embodiments are not limited thereto, and one or more metal layers may be further formed on the second metal layers 1240a, 1240b, and 1240c. At least some of the one or more metal layers formed above the second metal layer 1240a, 1240b, and 1240c may be formed of aluminum or the like having lower resistance than copper used to form the second metal layers 1240a, 1240b, and 1240c.

The interlayer insulation layer 1215 may be disposed on the first substrate 1210 to cover the plurality of circuit devices 1220a, 1220b, and 1220c, the first metal layers 1230a, 1230b, and 1230c, and the second metal layers 1240a, 1240b, and 1240c, and may include an insulation material such as silicon oxide or silicon nitride.

Lower bonding metals 1271b and 1272b may be formed on the second metal layer 1240b of the word line bonding area WLBA. In the word line bonding area WLBA, the lower bonding metals 1271b and 1272b of the peripheral circuit area PERI may be electrically connected to upper bonding metals 1371b and 1372b of the cell area CELL via bonding, and the lower bonding metals 1271b and 1272b and the upper bonding metals 1371b and 1372b may be formed of aluminum, copper, tungsten, or the like.

The cell area CELL may provide at least one memory block. The cell area CELL may include a second substrate 1310 and a common source line 1320. On the second substrate 1310, a plurality of word lines 1331 through 1338 (1330) may be stacked in a direction perpendicular to an upper surface of the second substrate 1310 (Z-axis direction). String selection lines and a ground selection line may be arranged above and below the plurality of word lines 1330, respectively, and the plurality of word lines 1330 may be arranged between the string selection lines and the ground selection line.

In the bit line bonding area BLBA, a channel structure CH may extend in a direction perpendicular to the upper surface of the second substrate 1310 and may penetrate through the word lines 1330, the string selection lines, and the ground selection line. The channel structure CH may include a data storage layer, a channel layer, and a buried insulation layer, and the channel layer may be electrically connected to a first metal layer 1350c and a second metal layer 1360c. For example, the first metal layer 1350c may be a bit line contact, and the second metal layer 1360c may be a bit line 1360c. According to an embodiment, the bit line 1360c may extend in a first direction (Y-axis direction) parallel to the upper surface of the second substrate 1310.

According to the embodiment of FIG. 19, an area where the channel structure CH, the bit line 1360c, and the like are arranged may be defined as the bit line bonding area BLBA. The bit line 1360c may be electrically connected to circuit devices 1220c that provide a page buffer 1393 in the peripheral circuit area PERI in the bit line bonding area BLBA. For example, the bit line 1360c may be connected to upper bonding metals 1371c and 1372c in the peripheral circuit area PERI, and the upper bonding metals 1371c and 1372c may be connected to lower bonding metals 1271c and 1272c connected to the circuit devices 1220c of the page buffer 1393.

In the word line bonding area WLBA, the word lines 1330 may each extend in a second direction (X-axis direction) parallel to the upper surface of the second substrate 1310, and may be connected to a plurality of cell contact plugs 1341 through 1347 (1340). The word lines 1330 may be connected to the cell contact plugs 1340 in pads where at least some of the word lines 1330 extend with different lengths in the second direction and are provided. A first metal layer 1350b and a second metal layer 1360b may be sequentially connected to upper ends of the cell contact plugs 1340 connected to the word lines 1330. In the word line bonding area WLBA, the cell contact plugs 1340 may be connected to the peripheral circuit area PERI through the upper bonding metals 1371b and 1372b of the cell area CELL and the lower bonding metals 1271b and 1272b of the peripheral circuit area PERI.

The cell contact plugs 1340 may be electrically connected to circuit devices 1220b that provide a row decoder 1394 in the peripheral circuit area PERI. According to an embodiment, an operating voltage of the circuit devices 1220b providing the row decoder 1394 may be different from an operating voltage of the circuit devices 1220c providing the page buffer 1393. For example, the operating voltage of the circuit devices 1220c providing the page buffer 1393 may be greater than the operating voltage of the circuit devices 1220b providing the row decoder 1394.

In the external pad bonding area PA, a common source line contact plug 1380 may be disposed. The common source line contact plug 1380 may be formed of a conductive material such as metal, a metal compound, or polysilicon, and may be electrically connected to the common source line 1320. A first metal layer 1350a and a second metal layer 1360a may be sequentially stacked above the common source line contact plug 1380. For example, an area where the common source line contact plug 1380, the first metal layer 1350a, and the second metal layer 1360a are arranged may be defined as the external pad bonding area PA.

In the external pad bonding area PA, first and second I/O pads 1205 and 1305 may be arranged. Referring to FIG. 19, a lower insulation layer 1201 covering a lower surface of the first substrate 1210 may be formed below the first substrate 1210, and the first I/O pad 1205 may be formed on the lower insulation layer 1201. The first I/O pad 1205 may be connected to at least one of the plurality of circuit devices 1220a, 1220b, and 1220c arranged in the peripheral circuit area PERI through a first I/O contact plug 1203, and may be separated from the first substrate 1210 by the lower insulation layer 1201. A lateral surface insulation layer may be arranged between the first I/O contact plug 1203 and the first substrate 1210 and may electrically separate the first I/O contact plug 1203 from the first substrate 1210.

Referring to FIG. 19, an upper insulation layer 1301 covering an upper surface of the second substrate 1310 may be formed above the second substrate 1310, and the second I/O pad 1305 may be arranged on the upper insulation layer 1301. The second I/O pad 1305 may be connected to at least one of the plurality of circuit devices 1220a, 1220b, and 1220c arranged in the peripheral circuit area PERI through a second I/O contact plug 1303.

According to embodiments, the second substrate 1310, the common source line 1320, and the like are not arranged in an area where the second I/O contact plug 1303 is arranged. In an embodiment, the second I/O pad 1305 does not overlap with the word lines 1330 in a third direction (Z-axis direction). Referring to FIG. 19, the second I/O contact plug 1303 may be separated from the second substrate 1310 in a direction parallel to the upper surface of the second substrate 1310, and may be connected to the second I/O pad 1305 by penetrating through the interlayer insulation layer 1315 of the cell area CELL.

According to embodiments, the first I/O pad 1205 and the second I/O pad 1305 may be selectively formed. For example, the memory device 1200 may include only the first I/O pad 1205 arranged above the first substrate 1201, or may include only the second I/O pad 1305 arranged above the second substrate 1301. Alternatively, the memory device 1200 may include both the first I/O pad 1205 and the second I/O pad 1305.

In the external pad bonding area PA and the bit line bonding area BLBA included in each of the cell area CELL and the peripheral circuit area PERI, a metal pattern of a topmost metal layer may exist as a dummy pattern or the topmost metal layer may be empty.

In the external pad bonding area PA, the memory device 1200 may form a lower metal pattern 1273a on the topmost metal layer of the peripheral circuit area PERI in correspondence with an upper metal pattern 1372a formed on the topmost metal layer of the cell area CELL, the lower metal pattern 1273a having the same shape as the upper metal pattern 1372a of the cell area CELL. In an embodiment, the lower metal pattern 1273a formed in the topmost metal layer of the peripheral circuit area PERI is not connected to a separate contact in the peripheral circuit area PERI. Similarly, in the external pad bonding area PA, the memory device 1200 may form an upper metal pattern on the topmost metal layer of the cell area CELL in correspondence with a lower metal pattern formed on the topmost metal layer of the peripheral circuit area PERI, the upper metal pattern having the same shape as the lower metal pattern of the peripheral circuit area PERI.

The lower bonding metals 1271b and 1272b may be formed on the second metal layer 1240b of the word line bonding area WLBA. In the word line bonding area WLBA, the lower bonding metals 1271b and 1272b of the peripheral circuit area PERI may be electrically connected to the upper bonding metals 1371b and 1372b of the cell area CELL via bonding.

In the bit line bonding area BLBA, the memory device 1200 may form an upper metal pattern 1392 on the topmost metal layer of the cell area CELL in correspondence with a lower metal pattern 1252 formed on the topmost metal layer of the peripheral circuit area PERI, the upper metal pattern 1392 having the same shape as the lower metal pattern 1252 of the peripheral circuit area PERI. In an exemplary embodiment, no contact is formed on the upper metal pattern 1392 formed on the topmost metal layer of the cell area CELL.

Figure 20:
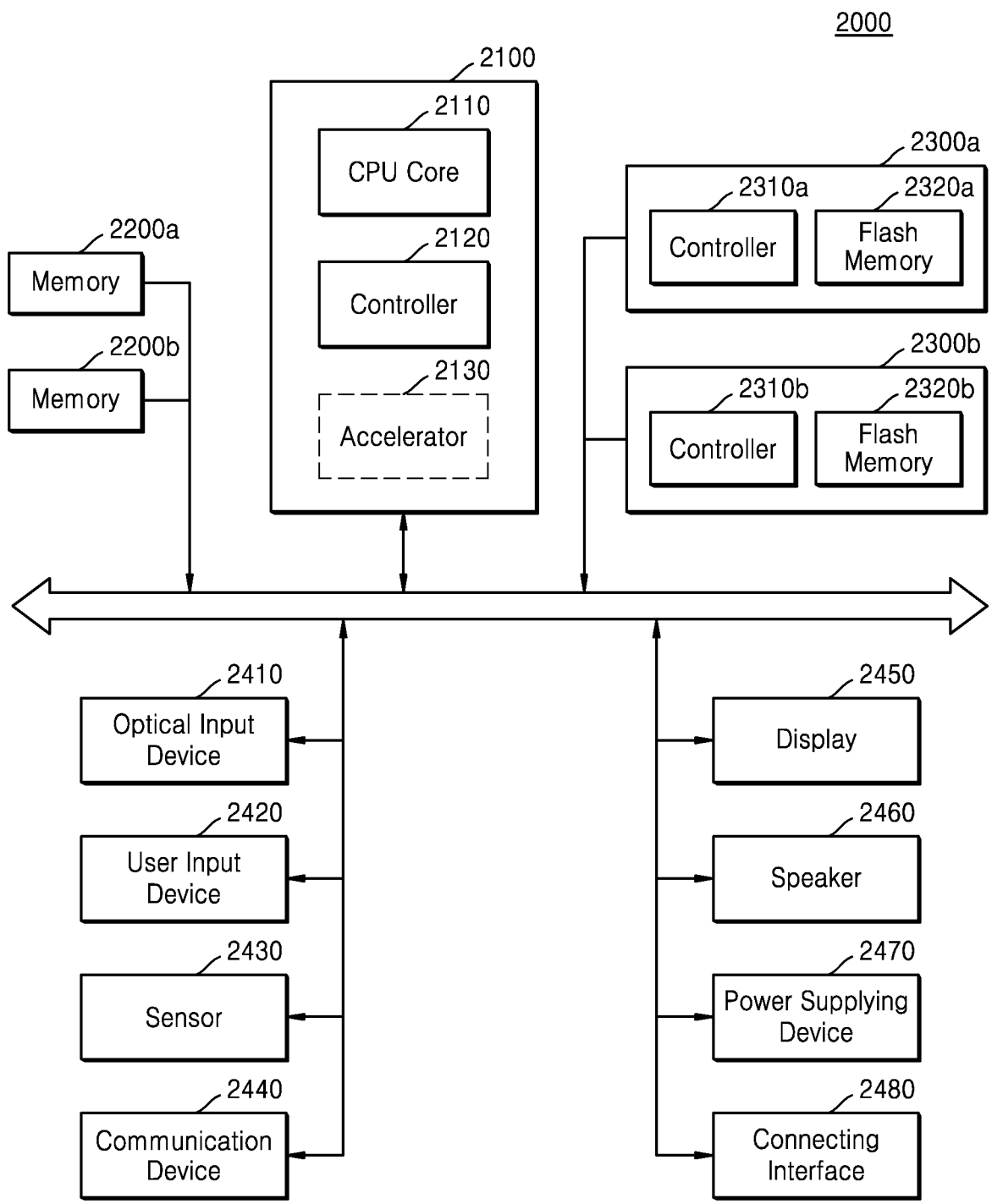
FIG. 20 is a block diagram of a system to which a storage device is applied, according to an exemplary embodiment of the inventive concept.

FIG. 20 is a block diagram of a system 2000 to which a storage device is applied, according to an embodiment of the inventive concept. The system 2000 of FIG. 20 may be, for example, a mobile system such as a mobile phone, a smartphone, a tablet personal computer (PC), a wearable apparatus, a health care apparatus, or an internet of things (TOT) apparatus. However, the system 2000 of FIG. 20 is not limited to the mobile system, but may be a PC, a laptop computer, a server, a media player, or an automotive device such as a navigation device.

Referring to FIG. 20, the system 2000 may include a main processor 2100, memories 2200a and 2200b, and storage devices 2300a and 2300b, and may further include one or more of an image capturing device 2410, a user input device 2420, a sensor 2430, a communication device 2440, a display 2450, a speaker 2460, a power supplying device 2470, and a connecting interface 2480.

The main processor 2100 may control overall operations of the system 2000, and more particularly, operations of other components of the system 2000. The main processor 2100 may be implemented using a general-use processor, a dedicated processor, an application processor (AP), or the like.

The main processor 2100 may include one or more CPU cores 2110, and may further include a controller 2120 for controlling the memories 2200a and 2200b and/or the storage devices 2300a and 2300b. According to embodiments, the main processor 2100 may further include an accelerator 2130 that is a dedicated circuit for performing a high-speed data operation such as an artificial intelligence (AI) data operation. The accelerator 2130 may include a Graphics Processing Unit (GPU), a Neural Processing Unit (NPU), and/or a Data Processing Unit (DPU), and may be implemented using a separate chip physically independent from other components of the main processor 2100.

The memories 2200a and 2200b may be used as main memory devices of the system 2000, and may each include a non-volatile memory such as an SRAM and/or a DRAM but may include a non-volatile memory such as a flash memory, a PRAM, and/or a RRAM. The memories 2200a and 2200b may be implemented within the same package as the main processor 2100.

The storage devices 2300a and 2300b may function as non-volatile storage devices that store data regardless of whether power is supplied. The storage devices 2300a and 2300b may include storage controllers 2310a and 2310b, respectively, and non-volatile memory (NVM) storages 2320a and 2320b storing data under the control of the storage controllers 2310a and 2310b, respectively.

For example, each of the storage controllers 2310a and 2310b may correspond to the memory controller described above with reference to FIGS. 1 through 19, and each of the NVM storages 2320a and 2320b may correspond to the memory device described above with reference to FIGS. 1 through 19. For example, each of the storage controllers 2310a and 2310b may include a channel arbitration module, and may support a function of arbitrating a plurality of channels connected to each of the NVM storages 2320a and 2320b, by using the channel arbitration module. A detailed description thereof may be substantially the same as that given above with reference to FIGS. 1 through 19, and thus will be omitted.

The storage devices 2300a and 2300b may be included in the system 2000 while being physically separated from the main processor 2100, and may be implemented within the same package as the main processor 2100. The storage devices 2300a and 2300b may be of a type such as a memory card, and thus may be detachably coupled with other components of the system 2000 through an interface such as the connecting interface 2480 which will be described later. Each of the storage devices 2300a and 2300b may be a device to which a standard rule is applied such as a universal flash storage (UFS), but embodiments are not limited thereto.

The image capturing device 2410 may capture a still image or a moving picture, and may be a camera, a camcorder, and/or a webcam.

The user input device 2420 may receive various types of data input by a user of the system 2000, and may be a touch pad, a keypad, a keyboard, a mouse, and/or a microphone.

The sensor 2430 may sense various types of physical quantities obtainable from the outside of the system 2000 and convert the sensed physical quantities into electrical signals. The sensor 2430 may be a temperature sensor, a pressure sensor, an illuminance sensor, a position sensor, an acceleration sensor, a biosensor, and/or a gyroscope.

The communication device 2440 may transmit and receive signals to and from other devices outside the system 2000 according to various communication protocols. The communication device 2440 may be implemented by including an antenna, a transceiver, and/or a MODEM.

The display 2450 and the speaker 2460 may function as output devices that output visual information and auditory information to the user of the system 2000, respectively.

The power supplying device 2470 may appropriately convert power supplied from a battery (not shown) built into the system 2000 and/or an external power source and supply the converted power to each component of the system 2000.

The connecting interface 2480 may provide a connection between the system 2000 and an external device that is connected to the system 2000 and capable of exchanging data with the system 2000. The connecting interface 2480 may be implemented as various interface types such as Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVM express (NVMe), IEEE 1394, universal serial bus (USB), a secure digital (SD) card, a multi-media card (MMC), an embedded multi-media card (eMMC), a Universal Flash Storage (UFS), an embedded Universal Flash Storage (eUFS), and a compact flash (CF) card interface.

Figure 21:
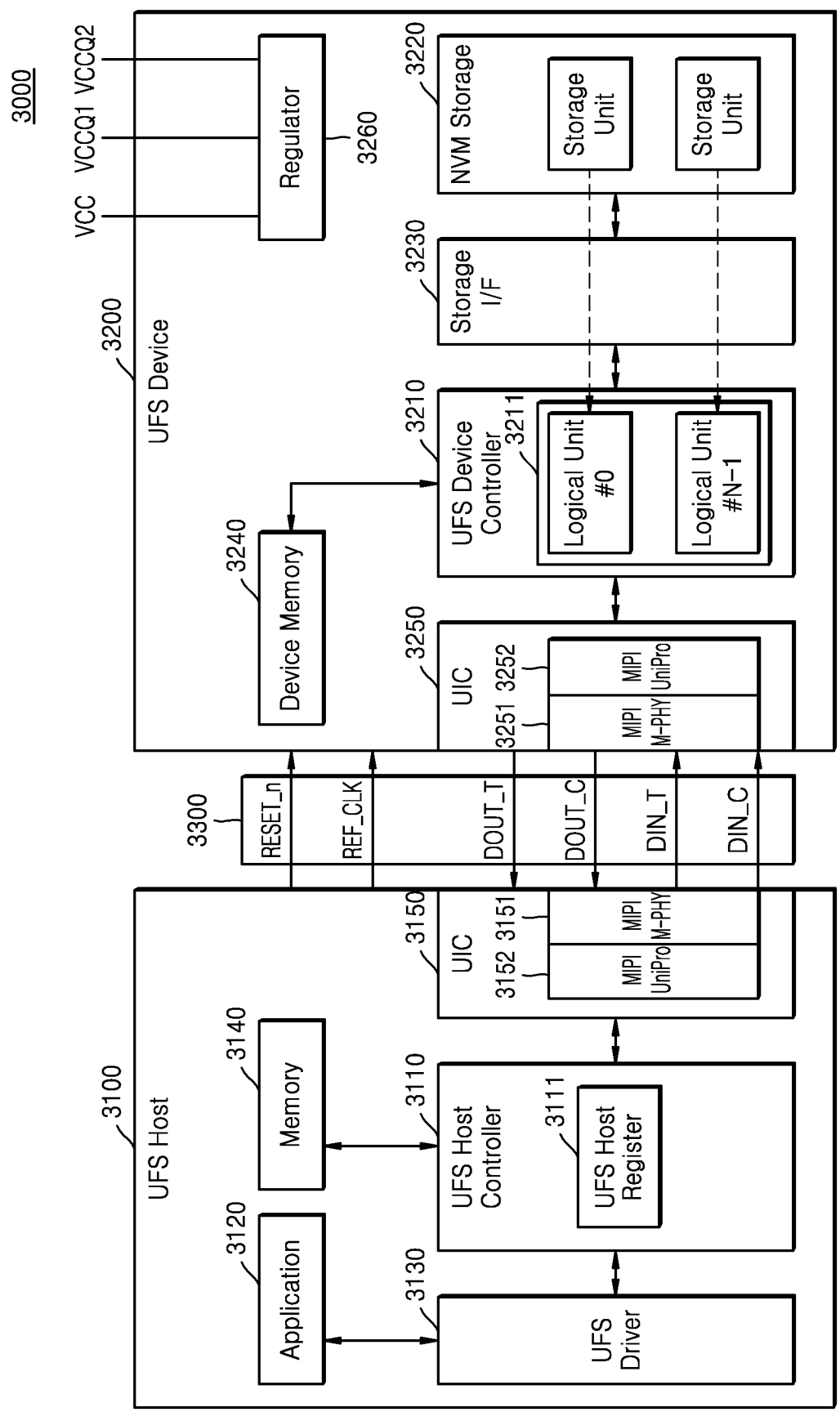
FIG. 21 is a block diagram for explaining a universal flash storage (UFS) system according to an exemplary embodiment of the inventive concept.

FIG. 21 is a block diagram for explaining a UFS system 3000 according to an embodiment of the inventive concept. The UFS system 3000 may be a system that follows the UFS standard published by the Joint Electron Device Engineering Council (JEDEC), and thus may include a UFS host 3100, a UFS device 3200, and a UFS I/F 3300. The description of the system 2000 of FIG. 20 given above is applicable to the UFS system 3000 of FIG. 21 without conflicting with the following description of FIG. 21.

Referring to FIG. 21, the UFS host 3100 and the UFS device 3200 may be connected to each other via the UFS I/F 3300. When the main processor 2100 of FIG. 20 is an AP, the UFS host 3100 may be implemented as a portion of the AP. A UFS host controller 3110 and a host memory 3140 may correspond to the controller 2120 of the main processor 2100 of FIG. 20 and the memories 2200a and 2200b of FIG. 20, respectively. The UFS device 3200 may correspond to the storage devices 2300a and 2300b of FIG. 20, and a UFS device controller 3210 and an NVM storage 3220 may correspond to the storage controllers 2310a and 2310b and the NVM storages 2320a and 2320b of FIG. 20, respectively.

The UFS host 3100 may include the UFS host controller 3110, an application 3120, a UFS driver 3130, a host memory 3140, and a UFS interconnect (UIC) layer 3150. The UFS device 3200 may include the UFS device controller 3210, the NVM storage 3220, a storage I/F 3230, a device memory 3240, a UIC layer 3250, and a regulator 3260. The UFS device controller 3210 and the NVM storage 3220 may be connected to each other via the storage I/F 3230. The storage I/F 3230 may be implemented to comply with a standard protocol such as a toggle or ONFI.

The application 3120 may refer to a program that desires communication with the UFS device 3200 in order to use a function of the UFS device 3200. The application 3120 may transmit an input-output request (IOR) to the UFS driver 3130 in order to accomplish input and output with respect to the UFS device 3200. The IOR may mean a request to read data, a request to write data, and/or a request to discard data, but is not limited thereto.

The UFS driver 3130 may manage the UFS host controller 3110 through a UFS-HCI (host controller interface). The UFS driver 3130 may convert an IOR generated by the application 3120 into a UFS command defined in the UFS standard, and may transmit the UFS command to the UFS host controller 3110. One IOR may be converted into a plurality of UFS commands. The UFS command may be basically a command defined by the SCSI standard, but may also be a UFS standard-dedicated command.

The UFS host controller 3110 may transmit the UFS command obtained by the UFS driver 3130 to the UIC layer 3250 of the UFS device 3200 through the UIC layer 3150 and the UFS I/F 3300. In this process, a UFS host register 3111 of the UFS host controller 3110 may play a role as a command queue (CQ).

The UIC layer 3150 on the side of the UFS host 3100 may include an MIPI M-PHY 3151 and an MIPI UniPro 3152, and the UIC layer 3250 on the side of the UFS device 3200 may include an MIPI M-PHY 3251 and an MIPI UniPro 3252.

The UFS I/F 3300 may include a line for transmitting a reference clock REF_CLK, a line for transmitting a hardware reset signal RESET_n for the UFS device 3200, a pair of lines for transmitting a pair of differential input signals DIN_T and DIN_C, and a pair of lines for transmitting a pair of differential output signals DOUT_T and DOUT_C.

The UFS device 3200 may generate various frequencies of clocks from a reference clock received from the UFS host 3100, by using a phase-locked loop (PLL) or the like. The UFS host 3100 may set the value of a data rate between the UFS host 3100 and the UFS device 3200 through the frequency value of the reference clock REF_CLK. In other words, the value of the data rate may depend on the frequency value of the reference clock REF_CLK.

The UFS I/F 3300 may support multiple lanes, and each of the multiple lanes may be implemented as a differential pair. For example, in FIG. 21, the pair of lines for transmitting the two differential input signals DIN_T and DIN_C may constitute a reception lane, and the pair of lines for transmitting the two differential output signals DOUT_T and DOUT_C may constitute a transmission lane. Although one transmission lane and one reception lane are illustrated in FIG. 21, the number of transmission lanes and the number of reception lanes may vary.

A reception lane and a transmission lane may transmit data in a serial communication method, and a structure in which the reception lane and the transmission lane are separated from each other enables full-duplex type communication between the UFS host 3100 and the UFS device 3200. In other words, the UFS device 3200 may transmit data to the UFS host 3100 through the transmission lane, while receiving data from the UFS host 3100 through the reception lane. Control data such as a command from the UFS host 3100 to the UFS device 3200, and user data that the UFS host 3100 desires to store in the NVM storage 3220 of the UFS device 3200 or to read from the NVM storage 3220 may be transmitted to the same lane.

The UFS device controller 3210 of the UFS device 3200 may control overall operations of the UFS device 3200. The UFS device controller 3210 may manage the NVM storage 3220 through a logical unit (LU) 3211, which is a logical data storage unit. The number of LUs 3211 may be, but is not limited to, eight. The UFS device controller 3210 may include a flash conversion layer.

When a command from the UFS host 3100 is input to the UFS device 3200 through the UIC layer 3250, the UFS device controller 3210 may perform an operation according to the input command, and, when the operation is completed, the UFS device controller 3210 may transmit a completion response to the UFS host 3100.

For example, when the UFS host 3100 desires to store user data in the UFS device 3200, the UFS host 3100 may transmit a data storage command to the UFS device 3200. When the UFS host 3100 receives, from the UFS device 3200, a response indicating that the UFS device 3200 is ready to transfer the user data, the UFS host 3100 may transmit the user data to the UFS device 3200. The UFS device controller 3210 may temporarily store the received user data in the device memory 3240, and may store the user data temporarily stored in the device memory 3240, in a selected location of the NVM storage 3220, based on address mapping information of an FTL.

As another example, when the UFS host 3100 intends to read user data from the UFS device 3200, the UFS host 3100 may transmit a data read command to the UFS device 3200. The UFS device controller 3210 may read the user data from the NVM storage 3220, based on the data read command, and may temporarily store the read user data in the device memory 3240. In this reading process, the UFS device controller 3210 may detect and correct an error to the read user data, by using an embedded ECC circuit (not shown). The UFS device controller 3210 may transmit the user data temporarily stored in the device memory 3240 to the UFS host 3100. The UFS device controller 3210 may further include an AES circuit (not shown).

The UFS host 3100 may sequentially store commands which are to be transmitted to the UFS device 3200, in the UFS host register 3111 capable of functioning as a command queue, and sequentially transmit the commands to the UFS device 3200. At this time, even while a previously transmitted command is still being processed by the UFS device 3200, namely, even before it is informed that the previously transmitted command has been completely processed by the UFS device 3200, the UFS host 3100 may transmit a command standing by on the command queue to the UFS device 3200, and accordingly, the UFS device 3200 may receive a next command from the UFS host 3100 even while processing the previously transmitted command.

A power supply voltage such as VCC, VCCQ1, or VCCQ2 may be input to the UFS device 3200. VCC is a main power supply voltage for the UFS device 3200, VCCQ1 is a power supply voltage for supplying a low range of voltage and is mainly for the UFS device controller 321, and VCCQ2 is a power supply voltage for supplying a range of voltage lower than VCC and higher than VCCQ1, and is mainly for an I/O interface such as the MIPI M-PHY 3251. The power supply voltages may be supplied to the components of the UFS device 3200 through the regulator 3260. The regulator 3260 may be implemented as a group of unit regulators respectively connected to different voltages from among the above-described power supply voltages.

While the inventive concept has been particularly shown and described with reference to embodiments thereof, it will be understood that various changes in form and details may be made therein without departing from the spirit and scope of the disclosure.

What is claimed is:

1. An operating method of a memory system including a memory device including a plurality of memory chips and a memory controller located external to the plurality of memory chips, the operating method comprising:
    setting, by the memory controller, a parameter indicating a first number of memory chips of the plurality of memory chips allowed to operate in parallel for each of a plurality of operation statuses, based on information about power consumption of each of the plurality of operation statuses of a memory chip among the memory chips;
    obtaining, by the memory controller, information indicating a second number of memory chips of the plurality of memory chips having one of the operation statuses from an operation status of each of the plurality of memory chips; and
    scheduling, by the memory controller, data access across a plurality of channels connecting the memory controller to the plurality of memory chips, based on the parameter indicating the first number and the information indicating the second number.

2. The operating method of claim 1, wherein the setting of the parameter comprises setting, as the parameter, a maximum number of the memory chips allowed to operate in parallel for each of the plurality of operation statuses such that an overall power consumption does not exceed a preset power amount, by using the information about the power consumption.

3. The operating method of claim 1, wherein the setting of the parameter comprises setting different parameters for each of the plurality of operation statuses for a combination of the plurality of operation statuses.

4. The operating method of claim 3, wherein the scheduling across the data access of the plurality of channels comprises:
    checking a value of a parameter corresponding to an operation of the plurality of memory chips, based on information about the operation status of each of the plurality of memory chips; and
    scheduling the data access across the plurality of channels, based on the checked value.

5. The operating method of claim 1, wherein the plurality of operation statuses comprise at least one of a program operation, a read operation, an erase operation, and an idle state.

6. The operating method of claim 1, wherein the setting of the parameter comprises setting a parameter table including the parameter that indicates the number of memory chips allowed to operate in parallel for each of the plurality of operation statuses within each of a plurality of temperature ranges, the parameter table being set for each of the plurality of temperature ranges.

7. The operating method of claim 6, wherein the scheduling of the data access across the plurality of channels comprises:
    sensing a temperature of the memory system;
    checking the parameter table corresponding to the sensed temperature; and scheduling the data access of the plurality of channels, based on the checked parameter table and the information about the respective operation status of each of the plurality of memory chips.

8. The operating method of claim 1, wherein the setting of the parameter comprises:
receiving specification information from a host; and setting the parameter, based on the received specification information and the information about power consumption of each of the plurality of operation statuses.

9. The operating method of claim 1, wherein the scheduling schedules the data access across the second number of channels when the second number is less than or equal the first number and otherwise schedules the data access across the first number of channels.

10. A memory system comprising:
a memory device including a plurality of memory chips;
a memory controller located external to the plurality of memory chips and configured to control an operation of the memory device; and a plurality of channels configured to connect each of the plurality of memory chips to the memory controller,
wherein the memory controller is configured to determine a first number of memory chips of the plurality of memory chips allowed to operate in parallel for each of a plurality of operation statuses based on information about power consumption of a memory chip among the memory chips, obtain information indicating a second number of memory chips of the plurality of memory chips having one of the operation statuses from an operation status of each of the plurality of memory chips, and schedule data access across the plurality of channels, based on a parameter indicating the first number and the information indicating the second number.

11. The memory system of claim 10, wherein the memory controller is configured to determine a number of the channels to approve to perform data transmission or reception and approve transmission or reception for the determined number of channels, such that an overall power consumption does not exceed a preset power amount, by using the parameter and the operation status of each of the plurality of memory chips.

12. The memory system of claim 11, wherein the memory controller is configured to determine the number of channels as many as the parameter among the plurality of channels according to an order of jobs of the memory system.

13. The memory system of claim 12, wherein the memory controller is configured to delay a job corresponding to one of the channels not approved to perform the transmission or reception.

14. The memory system of claim 10, wherein the memory controller is configured to determine one of the channels to approve to perform transmission or reception, when a new request is received from a host or an operation of at least one of the plurality of memory chips has ended.

15. The memory system of claim 10, further comprising a temperature sensor configured to sense a temperature of the memory system, wherein the parameter includes a plurality of sub-parameters that defines the number of memory chips allowed to operate in parallel for each of the plurality of operation statuses within each of a plurality of temperature ranges, and the memory controller is configured to check a sub-parameter corresponding to the sensed temperature, and schedule data transmission or reception of the plurality of channels, based on the checked sub-parameter and the checked operation status of each of the plurality of memory chips.

16. The memory system of claim 10, wherein the memory controller schedules the data access across the second number of channels when the second number is less than or equal the first number and otherwise schedules the data access across the first number of channels.

17. An operating method of a memory system including a memory device including a plurality of memory chips, the operating method comprising:
setting a parameter indicating a number of memory chips of the plurality of memory chips allowed to operate in parallel for each of a plurality of operation statuses, based on information about power consumption of each of the plurality of operation statuses of a memory chip among the memory chips;
obtaining information about an operation status of each of the plurality of memory chips; and
scheduling data access across a plurality of channels corresponding to the plurality of memory chips, based on the parameter and the information about the operation status of each of the plurality of memory chips,
wherein the setting of the parameter comprises setting a parameter table including the parameter that indicates the number of memory chips allowed to operate in parallel for each of the plurality of operation statuses within each of a plurality of temperature ranges, the parameter table being set for each of the plurality of temperature ranges.

18. The operating method of claim 17, wherein the scheduling of the data access across the plurality of channels comprises:
sensing a temperature of the memory system;
checking the parameter table corresponding to the sensed temperature; and
scheduling the data access of the plurality of channels, based on the checked parameter table and the information about the respective operation status of each of the plurality of memory chips.

* * * * *